US010684167B2

(12) United States Patent
Prenner et al.

(10) Patent No.: US 10,684,167 B2
(45) Date of Patent: Jun. 16, 2020

(54) OPTICAL MEASUREMENT METHOD AND SYSTEM

(71) Applicant: ALBERTA BIOPHOTONICS INC., Calgary, Alberta (CA)

(72) Inventors: Elmar Prenner, Calgary (CA); Kirat Singh, Calgary (CA)

(73) Assignee: ALBERTA BIOPHOTONICS INC., Calgary, Alberta (CA)

(*) Notice: Subject to any disclaimer, the term of this patent is extended or adjusted under 35 U.S.C. 154(b) by 0 days.

(21) Appl. No.: 16/098,763

(22) PCT Filed: Oct. 31, 2018

(86) PCT No.: PCT/CA2018/051387
§ 371 (c)(1),
(2) Date: Nov. 2, 2018

(87) PCT Pub. No.: WO2019/084689
PCT Pub. Date: May 9, 2019

(65) Prior Publication Data
US 2020/0088574 A1 Mar. 19, 2020

Related U.S. Application Data

(60) Provisional application No. 62/703,125, filed on Jul. 25, 2018.

(51) Int. Cl.
*G01J 3/44* (2006.01)
*G01J 3/10* (2006.01)
(Continued)

(52) U.S. Cl.
CPC .............. *G01J 3/0286* (2013.01); *G01J 3/10* (2013.01); *G01J 3/44* (2013.01); *G01J 3/4406* (2013.01);
(Continued)

(58) Field of Classification Search
CPC ..... G01J 3/0286; G01J 3/10; G01J 3/44; G01J 3/4406; G01J 2003/102; G01J 2003/1213
See application file for complete search history.

(56) References Cited

U.S. PATENT DOCUMENTS 3,806,259 A 4/1974 Malter et al.
3,910,701 A 10/1975 Henderson et al.
(Continued)

FOREIGN PATENT DOCUMENTS

WO 2018127757 A1 7/2018

OTHER PUBLICATIONS

International Patent Application No. PCT/CA2018/051387, International Search Report and Written Opinion dated Jan. 24, 2019, (11 pages).

*Primary Examiner* — Jamil Ahmed
(74) *Attorney, Agent, or Firm* — Stephen M. De Klerk

(57) ABSTRACT

An optical measurement method and system. The system includes, and method applies, a light source, a beamsplitter, at least one filter, a output photodetector for acquiring data of a sample, and a correction photodetector for correcting and maintaining output intensity from the light source. The filter is located between the light source and the correction photodetector for normalizing the spectrum of the input light being applied to input light correction. The filter may be incorporated into the beamsplitter and may be tuned to filter light from the light source for providing non-zero transmission of light with a near-zero gradient for wavelengths in a portion of the spectrum of the input light being applied to the sample and read by the output photodetector. The filter may also or alternatively be located downstream of the beamsplitter to correct for wavelength sensitivity of the correction photodetector.

31 Claims, 19 Drawing Sheets

(51) Int. Cl.
 G01J 3/28 (2006.01)
 G01J 3/02 (2006.01)
 *G01J 3/12* (2006.01)

(52) U.S. Cl.
 CPC . *G01J 2003/102* (2013.01); *G01J 2003/1213* (2013.01)

(56) References Cited

U.S. PATENT DOCUMENTS

| | | |
|---|---|---|
| 4,076,420 A | 2/1978 | De Maeyer et al. |
| 5,153,675 A | 10/1992 | Beauchaine et al. |
| 5,340,987 A * | 8/1994 | Eckles ............... G01N 21/3504 250/343 |
| 6,483,582 B2 | 11/2002 | Modlin et al. |
| 8,076,128 B2 | 12/2011 | Liederman et al. |
| 8,119,066 B2 | 2/2012 | Stock et al. |
| 8,496,879 B2 | 7/2013 | Atzler et al. |
| 9,413,130 B2 | 8/2016 | Hargis et al. |
| 9,618,449 B2 | 4/2017 | Chekalyuk et al. |
| 2002/0139936 A1 | 10/2002 | Dumas et al. |
| 2006/0223172 A1 | 10/2006 | Bedingham et al. |
| 2014/0377766 A1 | 12/2014 | Hopper et al. |
| 2018/0188183 A1 | 7/2018 | Feng et al. |
| 2018/0202932 A1 | 7/2018 | Mische et al. |

* cited by examiner

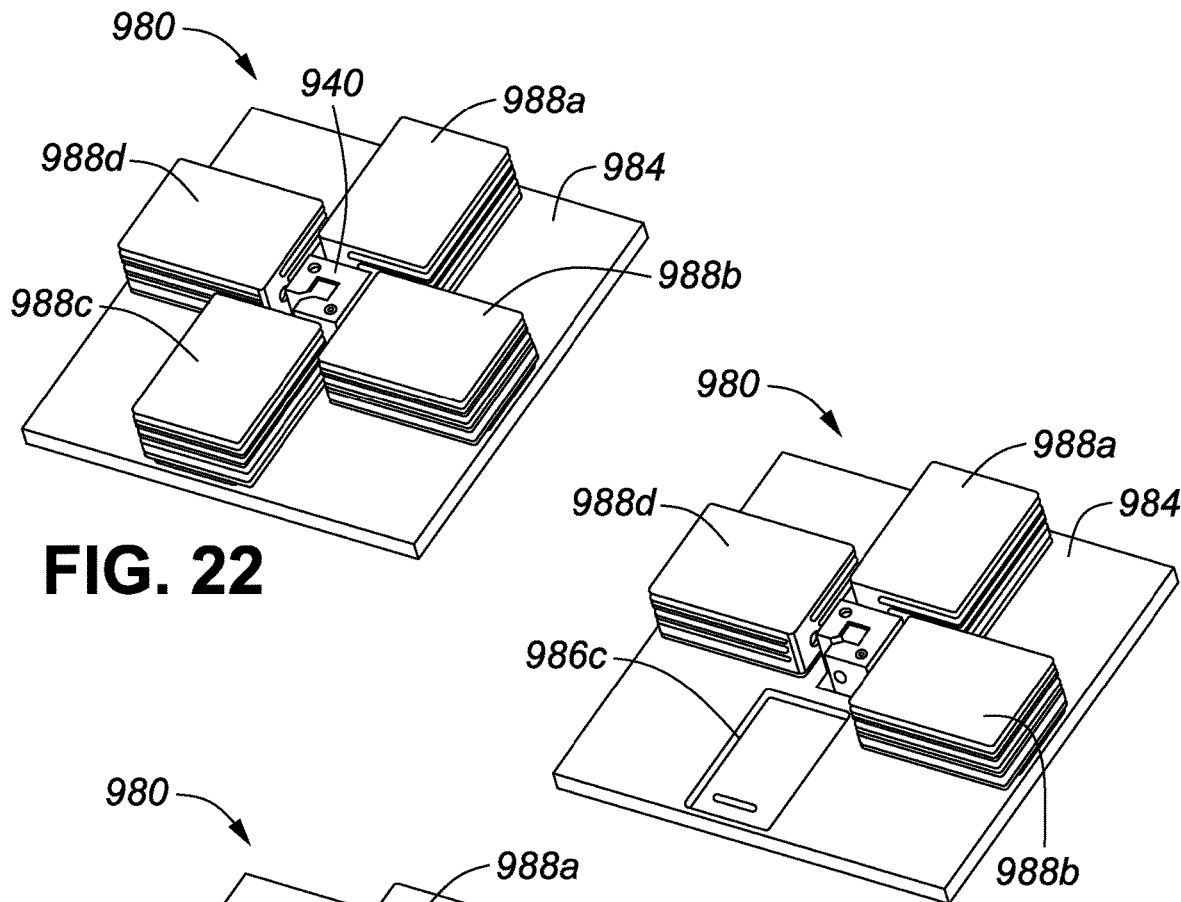
FIG. 22
FIG. 23
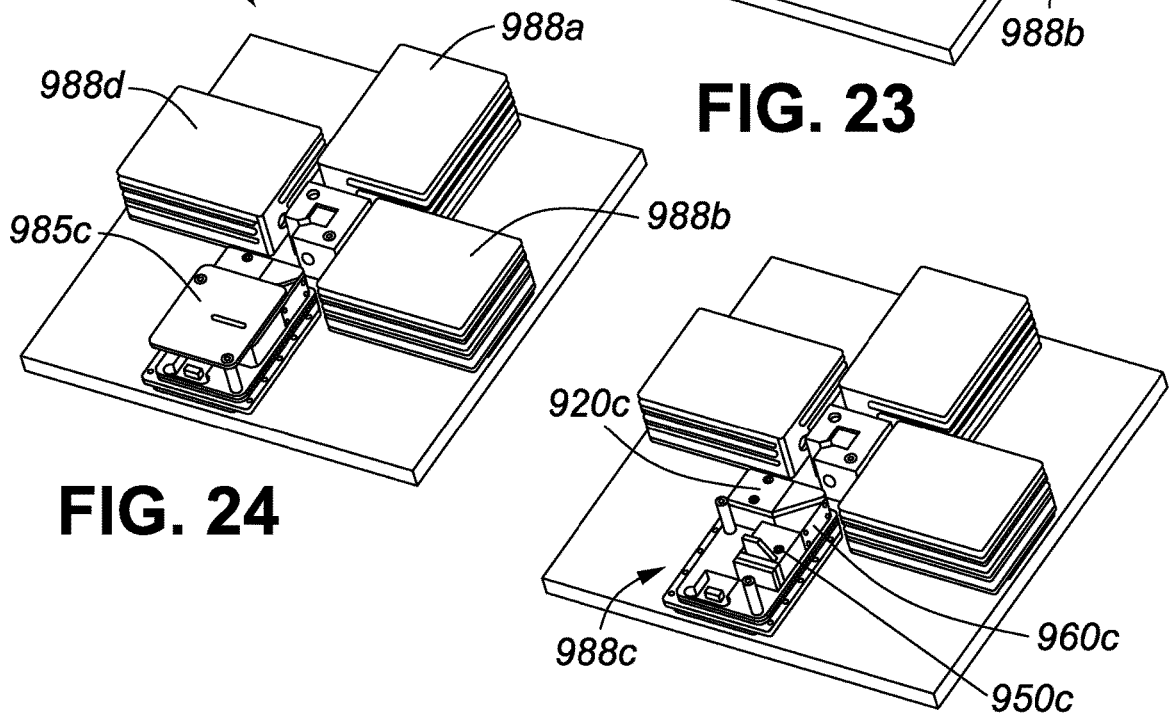
FIG. 24
FIG. 25

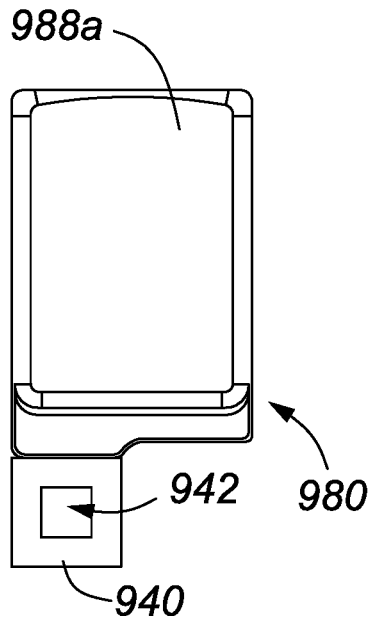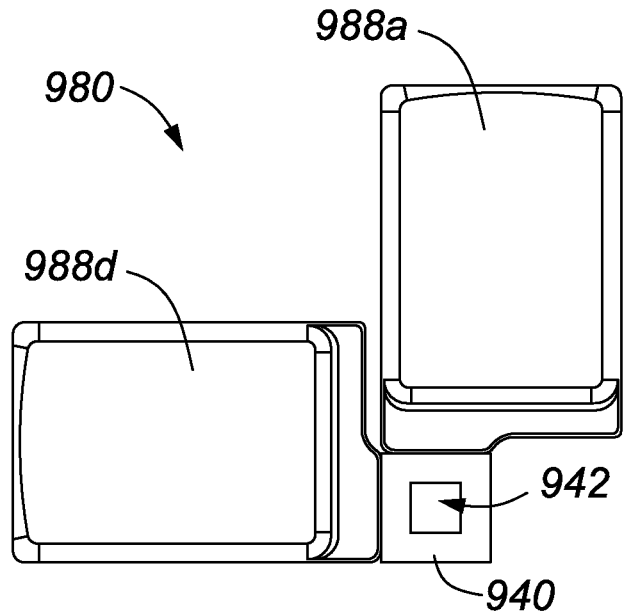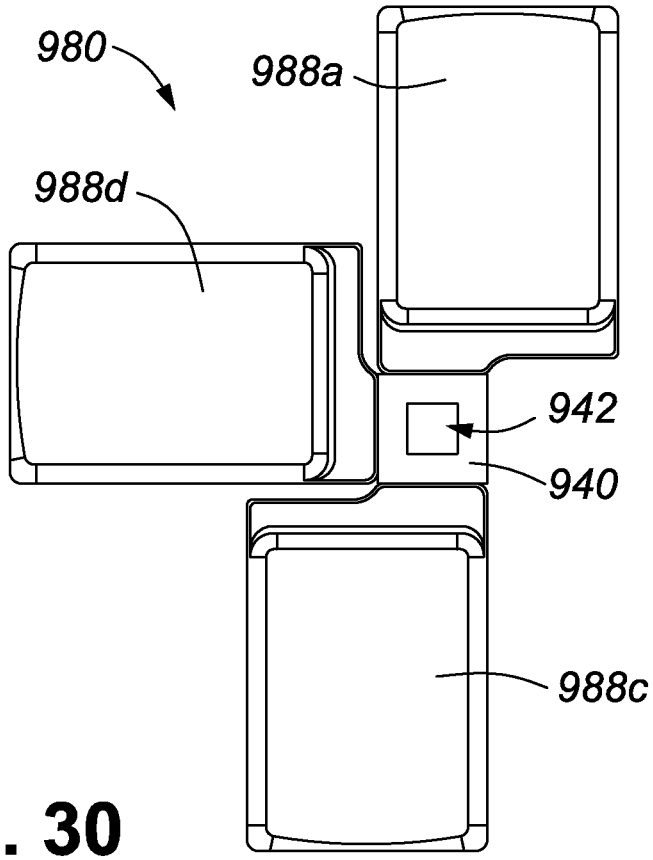

OPTICAL MEASUREMENT METHOD AND SYSTEM

CROSS-REFERENCE TO RELATED APPLICATIONS

This is a National Phase of International Application No. PCT/CA2018/051387, filed on Oct. 31, 2018, which claims the benefit of priority of each of Canadian Patent Application No. 2,984,276, filed Oct. 31, 2017, Canadian Patent Application No. 2,984,288, filed Nov. 1, 2017, and U.S. Patent Application No. 62/703,125 filed Jul. 25, 2018, each of which is entitled "OPTICAL MEASUREMENT DEVICE", and each of which is incorporated herein by reference in its entirety.

FIELD

The present disclosure relates generally to methods and devices for optical measurements.

BACKGROUND

Spectroscopy is a family of techniques, as opposed to being one technique. All spectroscopy techniques, whether based on absorption, optical density, scattering, fluorescence emission, fluorescence anisotropy, Raman spectroscopy, or others, involve emission of light from a light source. Emission of light is often accompanied by heating, which may cause problems in signal to noise ratio, emission intensity or other aspects of measurement accuracy, and may also cause problems. Heating also may result in degradation of the light source. A variety of approaches have been taken to mitigating the effect of heating on output from a light source, often by providing airflow for cooling fans.

Different types of spectroscopy may often be used in combination to greater advantage than one type of spectroscopy alone. A system with more than one light source may require greater cooling capacity than a system with only one light source. Similarly, systems with smaller profiles may suffer from effects of heating to a greater degree than system with larger footprints and more accommodation in the system for cooling by airflow or other methods.

SUMMARY

Stability of incident light intensity on a sample is necessary for performance of spectrophotometers. Any changes in optical intensity incident on the cuvette holder may affect experimental results. Heating is one cause of signal drift, and may cause bulbs or other light sources to drift in their wavelength distribution for output intensity. This may cause errors in readings and errors in correcting the intensity of the light source.

Changes in light source wavelength typically result in changes in the intensity of light transmitted by a dichroic beamsplitter. Transmission of the beamsplitter in the wavelength range shorter than the cut-on wavelength of the beamsplitter is generally characterized by minor transmission peaks. These transmission peaks may allow some transmission of the short wavelength light to a feedback photodetector for correcting the signal, and also referenced as a correction photodetector herein. Feedback signals to maintain the intensity of the light source are often based on intensity of the output from the light source. A change of the light source wavelength can change the intensity of transmitted light and thereby cause changes in the feedback circuit to change the light source in order to maintain the optical power incident on the feedback photodetector. This change in the light source leads to a change in the optical power incident on the sample contained in the cuvette.

In addition to changes in the output from the light source, the feedback photodetector has a spectral response, whereby the signal generated at the photodetector is dependent on the wavelength of the incident light. Even if the optical power incident on the feedback photodetector remains constant, the signal generated by the feedback photodetector may change as the optical spectrum of the incident light shifts either to longer or shorter wavelengths.

As a result, there is motivation to provide a system in which the optical power incident on the cuvette is independent on changes in the optical spectrum of light from the light source. To address both these mechanisms by which the light source power is affected by light source wavelength shift, we have applied a dichroic beamsplitter and a flattening filter, either alone or in combination.

Herein provided is an optical measurement system having control systems that minimize the degree of wavelength change from the light source, and make the feedback control loop insensitive to residual wavelength changes that are not eliminated at the light source. The system may include a thermal control system that dissipates heat generated by the light source, forcing the temperature of the light source to a set background temperature. The system may include an optical and electronic feedback control system that includes an optical filter that compensates for the spectral response of the optical detection component used in the feedback loop, whereby the signal generated by the optical detection component is independent of the wavelength of light incident at the spectral flattening filter and so any wavelength shift from the light source does not cause a change in the total optical power emitted by the light source.

In the dichroic beamsplitter, the short wavelength transmission region has a constant spectral transmission function, ensuring that the transmitted optical power does not vary with any change in the wavelength of light emitted by the light source. A constant spectral transmission function is defined by a transmission (T) against wavelength (A) graph where the gradient $dT/d\lambda$ is zero, or close to zero, in the spectral region that covers the spectral range of the excitation light incident upon the dichroic beamsplitter. This region may be a transmission region or a reflection region depending on the particular application. This first aspect of the modified optical system pertains to the transmission function of the dichroic beamsplitter and ensures that even if the spectrum of light emitted by the light source changes, the optical power transmitted by the dichroic beamsplitter is constant.

The dichroic beamsplitter does not change the spectrum of light incident on the feedback photodetector, which may change the signal generated by the feedback photodetector, even if the total power of light incident on the feedback photodetector remains constant. This would lead to the feedback control circuit to correct the light source current in order to maintain a constant signal at the feedback photodetector. The feedback photodetector signal changes as the spectrum of the light received by the feedback photodetector changes is that the feedback photodetector has a non-constant spectral response.

Even if the power level of the light source remains constant, the signal generated by the feedback photodetector will change based on the spectral shift of the incident light and the spectral response of the feedback photodetector. To cancel the spectral dependence of the feedback photodetector, an optical flattening filter is placed between the dichroic beamsplitter and the feedback photodetector. The spectral transmission function of this optical filter is the inverse of the spectral response of the feedback photodetector, such that product of the spectral transmission of the optical filter and the spectral response of the feedback photodiode is largely constant over at least that portion of the optical spectrum of the light that is transmitted through the dichroic beamsplitter.

With both the dichroic beamsplitter and the flattening filter, changes in the optical spectrum of the light emitted by the light source do not result in change in the intensity of light incident on the dichroic beamsplitter, and as a result, the intensity of light reflected by the dichroic beamsplitter. Either the dichroic beamsplitter or the flattening filter may also be used alone to improve signal stability.

Monitoring the temperature at two photodetectors facilitate software correction of the signal measured by the photodetectors. Specific materials may be used for the electronics boards used to act as heat sinks. Any mitigation of optically-induced heating of the feedback control photodiode will also contribute to signal stability. In addition, the system may be implemented in a hermetically sealed unit, with very low humidity, to minimize or prevent degradation of some of the optical and electronic components.

The system and methods described herein may facilitate more effective performance through heat management and cooling, and there may be advantages in terms of small footprints, facilitating modular units that allow the type of instrument occupying a given footprint to be changed easily by changing light sources. In addition, modular function allows experiments with multiple types of spectrophotometers at once, including one or more of fluorescence anisotropy, fluorescence emission, scattering, optical density, and Raman spectroscopy.

In a first aspect, herein provided is an optical measurement method and system. The system includes, and method applies, a light source, a beamsplitter, at least one filter, a output photodetector for acquiring data of a sample, and a correction photodetector for correcting and maintaining output intensity from the light source. The filter is located between the light source and the correction photodetector for normalizing the spectrum of the input light being applied to input light correction. The filter may be incorporated into the beamsplitter and may be tuned to filter light from the light source for providing non-zero transmission of light with a near-zero gradient for wavelengths in a portion of the spectrum of the input light being applied to the sample and read by the output photodetector. The filter may also or alternatively be located downstream of the beamsplitter to correct for wavelength sensitivity of the correction photodetector.

In a further aspect, herein provided is a method of optical measurement comprising: providing a sample in a sample holder; providing a light source for generating input light; splitting the input light into first light and second light with a dichroic beamsplitter; applying the first light to the sample, resulting in output light; measuring the output light in an output photodetector, resulting in sample data; measuring the second light in a correction photodetector, resulting in correction data; and correcting the intensity of the input light based on the correction data. One of the first light and the second light comprises reflected light and the other of the first light and the second light comprises transmitted light. The beamsplitter has a transmission function adapted for maintaining a non-zero transmission intensity, and a near-zero gradient, over a correction region of the input light.

In some embodiments, the light source is configured for a spectroscopy technique selected from the group consisting of fluorescence anisotropy, fluorescence emission, scattering, optical density, and Raman spectroscopy.

In some embodiments, providing the light source comprises providing a modular light source configured to be reversibly connected with the sample holder for applying the input light to the dichroic beamsplitter.

In some embodiments, providing the light source comprises providing a plurality of the modular light sources configured to be reversible connected with the sample holder.

In some embodiments, the plurality of modular light sources comprise at least two different light sources configured for at least two spectroscopy techniques.

In some embodiments, the first light comprises reflected light, the second light comprises transmitted light and the correction region comprises a reflection region.

In some embodiments, the first light comprises transmitted light, the second light comprises reflected light and the correction region comprises a transmission region.

In some embodiments, applying the second light to the photodetector for measuring the second light comprises: filtering the second light with a flattening filter, resulting in filtered light; and applying the filtered light to the correction photodetector for measuring the filtered light. The correction photodiode has a sensitivity function that varies with wavelength. The flattening filter has a transmission function adapted for normalizing the spectrum of the second light with respect to the sensitivity function to mitigate wavelength-dependent photosensitivity of the photodiode.

In some embodiments, the near-zero gradient comprises a normalized figure of merit below 0.25 at all points on the correction region, and averaging below 0.15 on the correction region.

In some embodiments, the method includes applying a short-pass filter or band-pass filter to the input light.

In some embodiments, the method includes applying a long-pass filter or band-pass filter to the output light.

In some embodiments, the method includes acquiring correction temperature data at the correction photodetector and normalizing the output of the correction photodetector based on the correction temperature data.

In some embodiments, the method includes acquiring output temperature data at the output photodetector and normalizing the output of the output photodetector based on the output temperature data.

In a further aspect, herein provided is a system for optical measurement comprising: a light source for generating input light; a dichroic beamsplitter downstream of the light source for splitting the input light into first light and second light; a sample holder downstream of a first path of the beamsplitter for receiving the first light, resulting in output light; an output photodetector for measuring output light emitted from the sample; a correction photodetector downstream of a second path of the beamsplitter for receiving the second light. One of the first light and the second light comprises reflected light and the other of the first light and the second light comprises transmitted light; the correction photodetector is configured for providing control signals to the light source for maintaining an intensity of the input light. The beamsplitter has a transmission function that maintains a non-zero transmission intensity and near-zero gradient over a correction region of the input light.

In some embodiments, the light source is configured for a spectroscopy technique selected from the group consisting of fluorescence anisotropy, fluorescence emission, scattering, optical density, and Raman spectroscopy.

In some embodiments, the light source comprises a modular light source configured to be reversibly connected with the sample holder.

In some embodiments, the light source comprises a plurality of the modular light sources, each configured to be reversibly connected with the sample holder.

In some embodiments, the plurality of modular light sources comprise at least two different light sources configured for at least two spectroscopy techniques.

In some embodiments, the first light comprises reflected light, the second light comprises transmitted light and the correction region comprises a reflection region.

In some embodiments, the first light comprises transmitted light, the second light comprises reflected light and the correction region comprises a transmission region.

In some embodiments, the system includes a flattening filter in the second path for filtering the second light, resulting in filtered light. The correction photodetector is downstream of the flattening filter for receiving the filtered light. The correction photodiode has a sensitivity function that varies with wavelength. The flattening filter has a transmission function adapted for normalizing the spectrum of the second light with respect to the sensitivity function to mitigate wavelength-dependent photosensitivity of the photodiode.

In some embodiments, the near-zero gradient comprises a normalized figure of merit below 0.25 at all points on the correction region, and averaging below 0.15 on the correction region.

In some embodiments, the system includes a short-pass filter or a bandpass filter between the light source and the dichroic beamsplitter.

In some embodiments, the system includes a long-pass filter or a bandpass filter between the dichroic beamsplitter and the output photodetector.

In some embodiments, the system includes a correction temperature sensor proximate the correction photodetector for acquiring correction temperature data at the correction photodetector and normalizing the output of the correction photodetector based on the output temperature data.

In some embodiments, the system includes an output temperature sensor proximate the output photodetector for acquiring output temperature data at the output photodetector and normalizing the output of the output photodetector based on the output temperature data.

In some embodiments, the system includes an insulating shield between the light source and the correction photodetector for mitigating heating of the correction photodetector, the insulating shield defining an aperture for providing access to the correction photodetector by the light source.

In some embodiments, the system includes a heatsink in thermal communication with the correction photodetector for cooling the correction photodetector.

In some embodiments, a thermally conductive circuit board in operative communication with the correction photodetector.

In some embodiments, the thermally conductive circuit board is in thermal connection with the light source for cooling the light source.

In some embodiments, the thermally conductive circuit board is in thermal connection with the output photodetector for cooling the output photodetector.

In a further aspect, herein provided is a method of optical measurement comprising: providing a sample in a sample holder; providing a light source for generating input light; splitting the input light into first light and second light with a beamsplitter; applying the first light to the sample, resulting in output light; applying the output light to a output photodetector, for measuring the output light; filtering the second light with a flattening filter, resulting in filtered light; measuring the filtered light in a correction photodetector, resulting in correction data; and correcting the intensity of the input light based on the correction data. The beamsplitter is not dichroic. The correction photodetector has a sensitivity function that varies with wavelength. The flattening filter has a transmission function adapted for normalizing the spectrum of the transmitted light with respect to the sensitivity function to mitigate wavelength-dependent photosensitivity of the photodiode.

In some embodiments, the light source is configured for a spectroscopy technique selected from the group consisting of fluorescence anisotropy, fluorescence emission, scattering, optical density, and Raman spectroscopy.

In some embodiments, providing the light source comprises providing a modular light source configured to be reversibly connected with the sample holder for applying the input light to the beamsplitter.

In some embodiments, providing the light source comprises providing a plurality of the modular light sources configured to be reversible connected with the sample holder.

In some embodiments, the plurality of modular light sources comprise at least two different light sources configured for at least two spectroscopy techniques.

In some embodiments, the first light comprises reflected light, the second light comprises transmitted light and the correction region comprises a reflection region.

In some embodiments, the first light comprises transmitted light, the second light comprises reflected light and the correction region comprises a transmission region.

In some embodiments, the method includes applying a short-pass filter or band-pass filter to the input light.

In some embodiments, the method includes applying a long-pass filter or band-pass filter to the output light.

In some embodiments, the method includes acquiring correction temperature data at the correction photodetector and normalizing the output of the correction photodetector based on the correction temperature data.

In some embodiments, the method includes acquiring output temperature data at the output photodetector and normalizing the output of the output photodetector based on the output temperature data.

In a further aspect, herein provided is a system for optical measurement comprising: a light source for generating input light; a beamsplitter downstream of the light source for splitting the input light into first light and second light; a sample holder downstream of a first path of the beamsplitter for receiving the first light, resulting in output light; an output photodetector for measuring output light emitted from the sample; a flattening filter in a second path of the beamsplitter for filtering the second light, resulting in filtered light; a correction photodetector downstream of the flattening filter for receiving the filtered light. The beamsplitter is not dichroic. One of the first light and the second light comprises reflected light and the other of the first light and the second light comprises transmitted light. The correction photodetector is configured for providing control signals to the light source for maintaining an intensity of the input light. The correction photodiode has a sensitivity function that varies with wavelength. The flattening filter has a transmission function adapted for normalizing the spectrum of the second light with respect to the sensitivity function to mitigate wavelength-dependent photosensitivity of the photodiode.

In some embodiments, the light source is configured for a spectroscopy technique selected from the group consisting of fluorescence anisotropy, fluorescence emission, scattering, optical density, and Raman spectroscopy.

In some embodiments, the light source is configured for a spectroscopy technique selected from the group consisting of fluorescence anisotropy, fluorescence emission, scattering, optical density, and Raman spectroscopy.

In some embodiments, the light source comprises a modular light source configured to be reversibly connected with the sample holder.

In some embodiments, the light source comprises a plurality of the modular light sources, each configured to be reversibly connected with the sample holder.

In some embodiments, the plurality of modular light sources comprise at least two different light sources configured for at least two spectroscopy techniques.

In some embodiments, the first light comprises reflected light, the second light comprises transmitted light and the correction region comprises a reflection region.

In some embodiments, the first light comprises transmitted light, the second light comprises reflected light and the correction region comprises a transmission region.

In some embodiments, the system includes a short-pass filter or a bandpass filter between the light source and the dichroic beamsplitter.

In some embodiments, the system includes a long-pass filter or a bandpass filter between the dichroic beamsplitter and the output photodetector.

In some embodiments, the system includes a correction temperature sensor proximate the correction photodetector for acquiring correction temperature data at the correction photodetector and normalizing the output of the correction photodetector based on the output temperature data.

In some embodiments, the system includes a correction temperature sensor proximate the correction photodetector for acquiring correction temperature data at the correction photodetector and normalizing the output of the correction photodetector based on the output temperature data.

In some embodiments, the system includes an output temperature sensor proximate the output photodetector for acquiring output temperature data at the output photodetector and normalizing the output of the output photodetector based on the output temperature data.

In some embodiments, the system includes an insulating shield between the light source and the correction photodetector for mitigating heating of the correction photodetector, the insulating shield defining an aperture for providing access to the correction photodetector by the light source.

In some embodiments, the system includes a heatsink in thermal communication with the correction photodetector for cooling the correction photodetector.

In some embodiments, the heatsink includes a thermally conductive circuit board in operative communication with the correction photodetector.

In some embodiments, the thermally conductive circuit board is in thermal connection with the light source for cooling the light source.

In some embodiments, the thermally conductive circuit board is in thermal connection with the output photodetector for cooling the output photodetector.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached figures, in which reference numerals sharing a common final two digits refer to corresponding features across figures (e.g. the light source 20, 120, 220, 320, 420, 520, 620, 720, 820, 920 etc.):

FIG. 22 is a perspective view of an optical measurement system with four light source modules;

FIG. 23 is a perspective view of the system of FIG. 22 with one light source module removed;

FIG. 24 is a perspective view of the system of FIG. 22 with one light source module removed;

FIG. 25 is a perspective view of the system of FIG. 22 showing interior components of one light source;

FIG. 28 is a plan view of the system of FIG. 27 with one module;

FIG. 29 is a plan view of the system of FIG. 27 with two modules; and

FIG. 30 is a plan view of the system of FIG. 27 with three modules.

DETAILED DESCRIPTION

Figure 1:
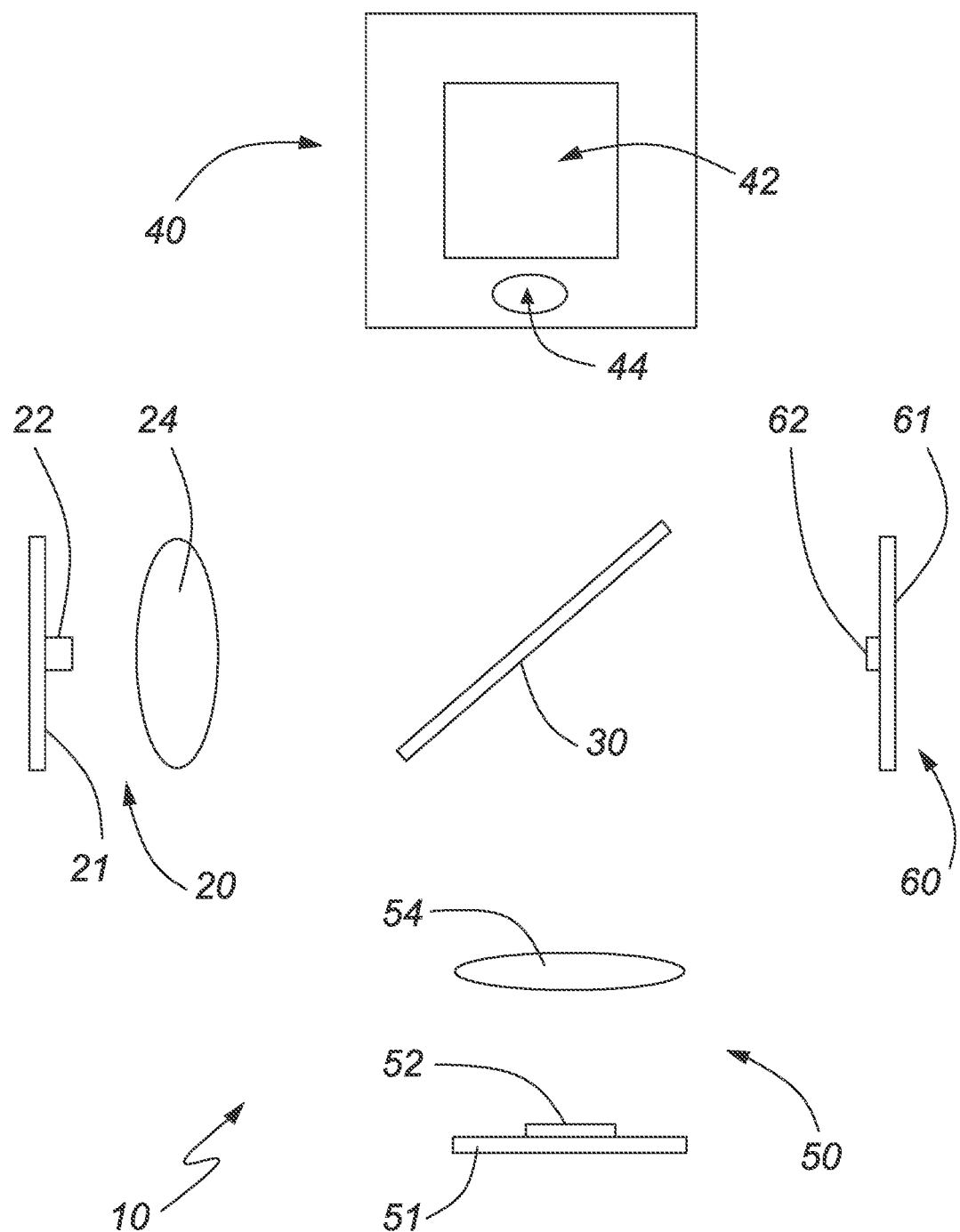
FIG. 1 is schematic of an optical measurement system.

In any form of spectroscopy, the intensity of the incident light from a light source on a sample, often in a cuvette, contributes to accurate and effective measurement of the sample. The incident light on the cuvette is necessarily a function of the output from the light source. As a result, stable output from the light source in terms of intensity at each wavelength of the output light contributes to accurate and effective measurements of the sample. It is, therefore, desirable to stabilize output from the light source.

Consistency and stability of light incident on the sample is necessary for instrument performance. If there is a change in the intensity of incident light on the sample, this may manifest as a change in the optical signal measured by the instrument, which may in turn skew the observed results on the system being measured in the cuvette. Most optical light sources, whether a light emitting diode ("LED"), an incandescent bulb, a laser, thermal light source, a resonant-cavity LED or others, generate heat along with light. In many cases, heating is associated with wavelength drift in intensity peaks along an input light spectrum. The wavelength drift may affect instrument performance. Outside of instrument performance, heating may also effect bulb lifespan.

The methods and systems described herein may be applied to fluorescence emission, fluorescence anisotropy, optical density, absorption, Raman, fluorescence lifetime, optical scattering or other forms of spectroscopy. Any method in which a light source is used to apply input light incident on a beamsplitter, with transmission and reflection of light allowing a output photodetector to read from either reflected light or transmitted light that passes through a sample. The remaining transmitted light or reflected light may be applied to a correction photodetector, such as a feedback control photodiode, to maintain defined intensity characteristics of the input light.

To mitigate the effects of spectral drift in the input light, the methods and systems described herein apply one or more light filters. The filter may be a dichroic beamsplitter for providing transmitted light and reflected light, one of which may be applied to the sample and the other of which may be used for correction of the input light.

In systems using dichroic beamsplitters, and in which the reflected input light is being applied to the sample, the beamsplitter is tuned to have a non-zero transmission of the input light at the wavelengths expected to be incident on the beamsplitter. In contrast, in a dichroic beamsplitter systems in which the transmitted input light is being applied to the sample, the beamsplitter is tuned to have a non-zero reflection of the input light at the wavelengths expected to be incident on the beamsplitter. In both cases, the beamsplitter will also maintain a near-zero change in transmission or reflection (as appropriate) over the wavelength range of the input light being applied to the sample.

The near-zero gradient may be in the range of a normalized figure of merit ("FOM") below 0.25 at all points on a portion of the spectrum at which the input light may be incident on the beamsplitter, and averaging below 0.15 on the same region. This region is referenced as a correction region herein as it is the wavelength region on which the output of the light source is corrected. The near-zero gradient must be assessed in normalized values, as, for example, a 0.1% change in absolute transmission or reflection is significant if the average transmission in this spectral range is 1%, but a change of 0.1% in the absolute transmission or reflection is less significant if the average transmission in this spectral range is 10%. The FOM is defined as a function of the change in T by wavelength as a function of A, where T is the percentage transmission of the dichroic beamsplitter at wavelength A. By dividing the gradient $dT/d\lambda$ by the local transmission T, we establish a normalised FOM for systems with perpendicular samples to the light source where reflection light is incident on the sample (see e.g. FIG. 1, etc.).

Where the sample is opposite the light source (see FIGS. 12 and 13) the same approach is used but instead, FOM is defined as a function of the change in T by wavelength divided by T, FOM is defined as a function of the change in R by wavelength as a function of R, where R is the percentage reflection of the dichroic beamsplitter at wavelength A.

The filter may also or alternatively be located downstream of the beamsplitter in a spectral flattening filter. The spectral flattening filter may be tuned to mitigate variations in sensitivity of the correction photodetector at different wavelengths. The spectral flattening filter transmits a greater amount of light at wavelengths that the correction photodetector is less sensitive to. As a result, the intensity of the light reaching the correction photodetector is less affected by variations in sensitivity of the photodetector to different wavelengths of light. The filter supports an optoelectronic feedback control system that maintains intensity and mitigates the effects of spectral intensity drift due to a change in the output of the light source.

The tuned dichroic beamsplitter and the spectral flattening filter may be applied individually or in combination to mitigate the effects of changes in light intensity caused by a change in the spectrum of light emitted by the light source. The light source may be subject to spectral drift, and with a non-zero and stable transmission function, the tuned dichroic beamsplitter transmits or reflects (depending on the particular system) light with a consistent intensity regardless of the wavelength distribution of the light. When the light source is subject to spectral drift within a defined reflection or transmission window of the transmission function, the spectral drift does not affect the intensity of the resulting signal. The correction photodetector may have variable sensitivity to different wavelengths of light, and the spectral flattening filter normalizes the intensity of input light across wavelengths to account for the sensitivity of the correction photodetector at different wavelengths.

A significant amount of output drift at the light source is a result of heating of the bulb. As a result, in addition to filtering the light to account for changes in the wavelength distribution of light from the light source, effectively cooling the system may also mitigate drift and improve performance and sensitivity. The light source, the output photodetector and the correction photodetector may each be mounted to a thermally conductive board to dissipate heat through. The thermally conductive board may include copper, aluminum and insulation portions arranged to allow heat to dissipate from the system effectively. The thermally conducting circuit boards are in physical and thermal contact with the system, and so maintain the same temperature as the system. The heat generated by the optical sensor is dissipated effectively through the circuit board to the body of a spectrophotometer applying the system.

In addition to applying the thermally conductive boards to stabilize the temperatures of the correction photodetector and the output photodetector, temperature sensors may be mounted in close proximity to the photodetectors. The temperature sensors receive data that is recorded by control software. For both the feedback control photodiode and the optical sensor, given a known function of the signal in totally dark environment as a function of temperature as well as a known function of the sensitivity as s function of temperature, a correction to the measured and logged readings can be applied in a post-processing stage.

The dichroic beamsplitter and the flattening filter may facilitate small form factors that remain accurate and high performance. Small form factors may include several modules with different optical systems, light sources, photodetectors or both, in each module. The modules may include one or more light sources to generate light and one or more photodetectors to receive light. For example, one module can send out light and an opposite one detects for optical density and a side one (relative to the light source) detects side scattering.

Each module, or a system they are docked on, may include a memory including information on the module. The modules plug into a receiving location by wired connection, contact or other suitable connections, to a dock electronics board. When the module plugs into the board, it may be placed in communication with a computer, tablet, phone or other user interface that has software to characterize and take advantage of the arrangement of the modules.

The system may include a board that serves as an instrument base, and includes power management, thermal control, wireless connections, universal serial bus, global positioning system and other wired communications, and the electronics main board. The instrument base may be designed to interface with a number of modules, in some examples up to four modules. These modules contain all the optics and electronics to operate the system. Depending on the type of module or module combination used, fluorescence anisotropy, fluorescence emission, scattering, optical density, Raman spectroscopy or others may be applied. By changing the modules, a user may change the nature of the instrument. Placing fluorescence, anisotropy or scattering modules opposite each other may allow use as optical density modules. The excitation module of an optical density pair may be used in conjunction with a scattering module or a fluorescence module to allow specific measurements, or any other suitable applications.

In a fluorescence module, spectrally filtered light is directed out of the module by a system including a lens, spectral filter and beamsplitter. This light may excite fluorescence within the sample in the cuvette, and any fluorescence light is collected and its power measured by a system of one or more of: lens, spectral filter, beamsplitter and optical sensor. This type of module can perform fluorescence measurements on the sample in the cuvette.

In a fluorescence anisotropy module, spectrally filtered and polarized light is directed out of the module by system of one or more of: lens, spectral filter, polarizer and beamsplitter. This light may excite fluorescence within the sample in the cuvette, and any fluorescence light is collected and its power measured by a system of one or more of: lens, spectral filter, polarizer, beamsplitter and optical sensor. This type of module can perform fluorescence anisotropy and fluorescence measurements on the sample in the cuvette.

Optical filters and plastic optical polarizers can degrade slowly over time in the presence of moisture in humidity. To mitigate humidity in the modules, the modules may be hermetically sealed and include desiccant material within the module. The hermetic seal may be created by the use of o-rings. One o-ring may be placed between a base and a lid of a module body, and one or more o-rings may be placed, one either side of an optical glass window on the front of the module through which light passes in and out of the module. In order to hold the desiccant granules, one or more recessed regions may be milled in the base of the module, and filled with the desiccant granules. A perforated cover may be placed over the top to retain the desiccant granules, while allowing air exchange between the module interior and the desiccant granules. After a module is sealed shut after assembly, the humidity in the air within the module reduces as the water molecules are trapped by the desiccant material.

FIG. 1 is an optical measurement system 10. The system 10 includes a light source 20 and a dichroic beamsplitter 30 downstream of the light source 20. A sample holder 40 is located downstream of the dichroic beamsplitter 30 and in a position to receive reflected light from the light source 20. A output photodetector module 50 is located downstream of the dichroic beamsplitter 30 and in a position to receive sample output light from the light source 20 that has passed through the sample holder 40 and transmitted through the dichroic beamsplitter 30. A correction photodetector module 60 is located downstream of the dichroic beamsplitter 30 and positioned to receive light transmitted through the dichroic beamsplitter 30 from the light source 20.

The light source 20 includes a bulb 22 mounted on a board 21, and a lens 24 positioned downstream of the bulb 22. The bulb 22 largely collimates the input light. The bulb 22 may be any suitable light source, including an LED, an incandescent bulb, a laser, thermal light source, a resonant-cavity LED or others. The lens 24 collimates the input light from the bulb 22.

The dichroic beamsplitter 30 is tuned to allow non-zero transmission of the input light at the wavelengths expected to be incident on the dichroic beamsplitter 30, and to maintain a near-zero change in transmission over the wavelength range of the input light being applied to the sample holder 40.

The sample holder 40 includes a sample cavity 42 for receiving a cuvette or other container for a liquid sample, or for receiving a solid state sample. The sample holder includes a lens 44 for focusing reflected input light onto the sample cavity 42. The lens 44 may be omitted in applications where the light incident on the sample does not benefit from being focused.

The output photodetector module 50 includes an optical sensor 52 mounted on a board 51. The optical sensor 52 is for detecting transmitted light through the dichroic beamsplitter 30 from the sample holder 40. A collection lens 54 is located between the dichroic beamsplitter 30 and the optical sensor 52. In a fluorescence spectrometer, fluorometer, fluorimeter or other fluorescence-based instrument applying the optical measurement system 10, fluorescence light generated by the sample upon excitation by light from the light source 20 is transmitted from the sample holder 40 to the output photodetector 50.

The correction photodetector module 60 provides a feedback photodetector function. The correction photodetector module 60 includes a correction optical sensor 62 mounted on a board 61. The correction optical sensor 62 may include a photodiode or any suitable optical sensor. Light incident on the correction optical sensor 62 is read to determine the intensity of the light that is transmitted through the dichroic beamsplitter 30. The intensity of the light transmitted through the dichroic beamsplitter 30 is corrected to a set value by adjusting power to the bulb 22.

Figure 2:
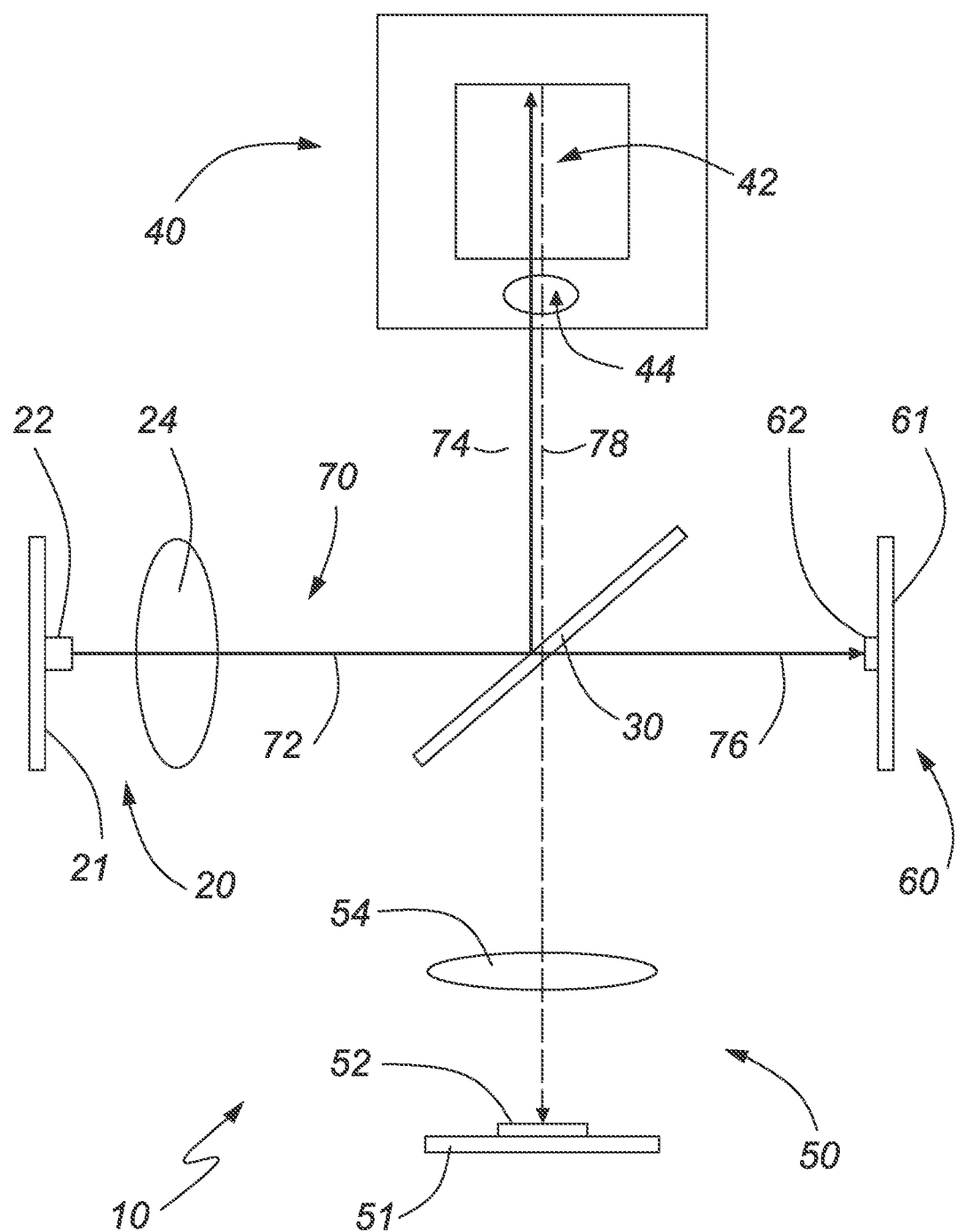
FIG. 2 is a schematic of the system of FIG. 1 in operation.

FIG. 2 is the system 10 in operation. Input light 70 is generated by the light source 20. Incident light 72 contacts the dichroic beamsplitter 30, resulting in reflected light 74 and transmitted light 76. The reflected light 74 enters the sample holder 40 and is returned as output light 78, which is transmitted through the dichroic beamsplitter 30 and reaches the output photodetector module 50, providing experimental data. The transmitted light 76 reaches the correction photodetector module 60, providing correction data for modulating output of the light source 20. The output light 78 may be fluorescence emission light, light transmitted through the sample holder 40 for an optical density reading, or any suitable output light that is read by the output photodetector 50.

Figure 3:
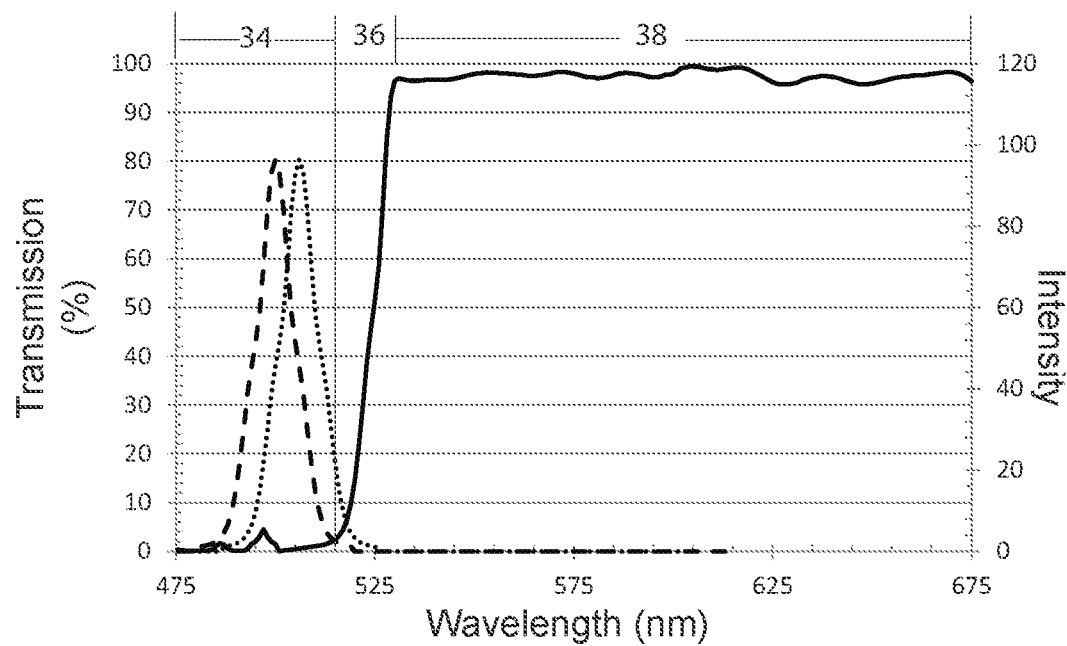
FIG. 3 is a generalized plot of a transmission function of a prior art beamsplitter and of input light at two wavelengths.
Figure 4:
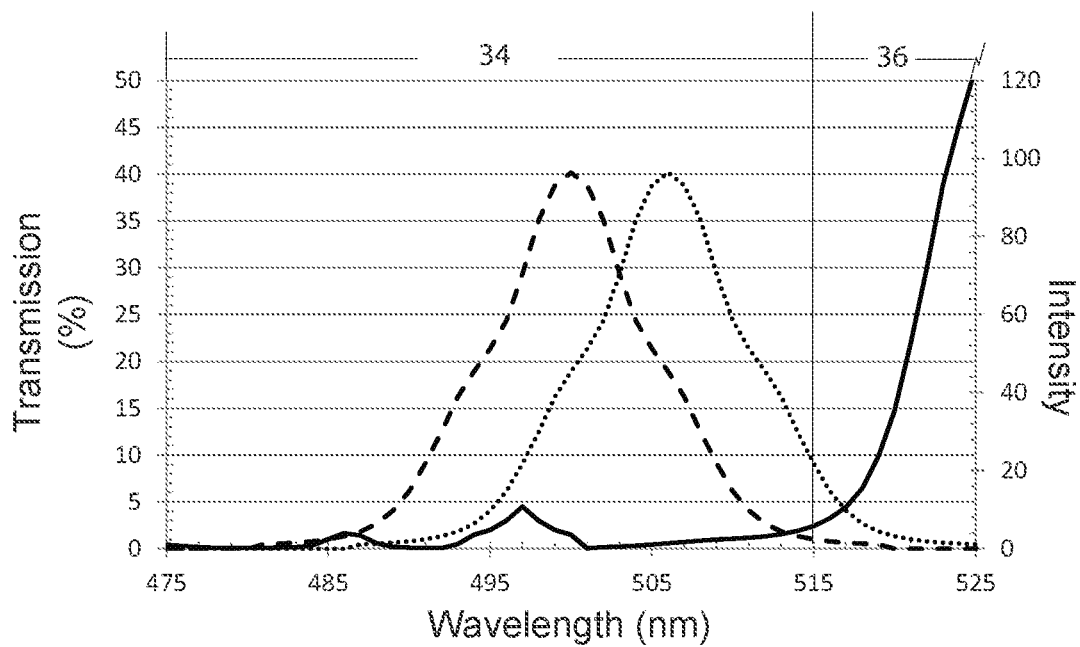
FIG. 4 is a detail view of the plot of FIG. 3.

FIGS. 3 and 4 show a plot of a prior art beam splitter's transmission function (solid lines) with a generalized input light spectrum at a first temperature (dashed lines), and the same input light spectrum at a second, different temperature (dotted lines). Minimizing changes in the temperature of a light source is important due to an inverse relationship between the efficiency of most bulbs and temperature. Using LEDs as an example, at the same voltage and current, a cool LED will output a higher optical power level than a warmer LED. An LED will self-heat as electrical current is passed through it. If the LED is supplied with a constant electrical current, then the light output will decrease over time as the LED temperature increases. It is therefore important that self-heating of the LED be minimized. Secondly, the optical spectrum of the LED changes with temperature of the LED.

A change in spectrum may change the signal detected by the photodiode, and this change may not be distinguishable from a change in the signal due to a change due to a chemical or physical process in the sample being analyzed. The intensity of the dashed data series at the first temperature will be greater than the intensity of the dotted data series at the second temperature because the spectral artifact around 488 nm is absent from the spectral range of the dotted data series at the second temperature. Furthermore, a change in the spectrum of the light will produce a change in the signal at the correction photodetector due to the wavelength dependent response of the correction photodetector.

In FIGS. 3 and 4, a reflection region 34 of the transmission spectrum shows high reflectivity, and a transition region 36 at higher wavelengths shows increasing reflectivity. The transition region 36 gives way to a transmission region 38 at higher wavelengths, where the light flows through the beamsplitter.

Figure 5:
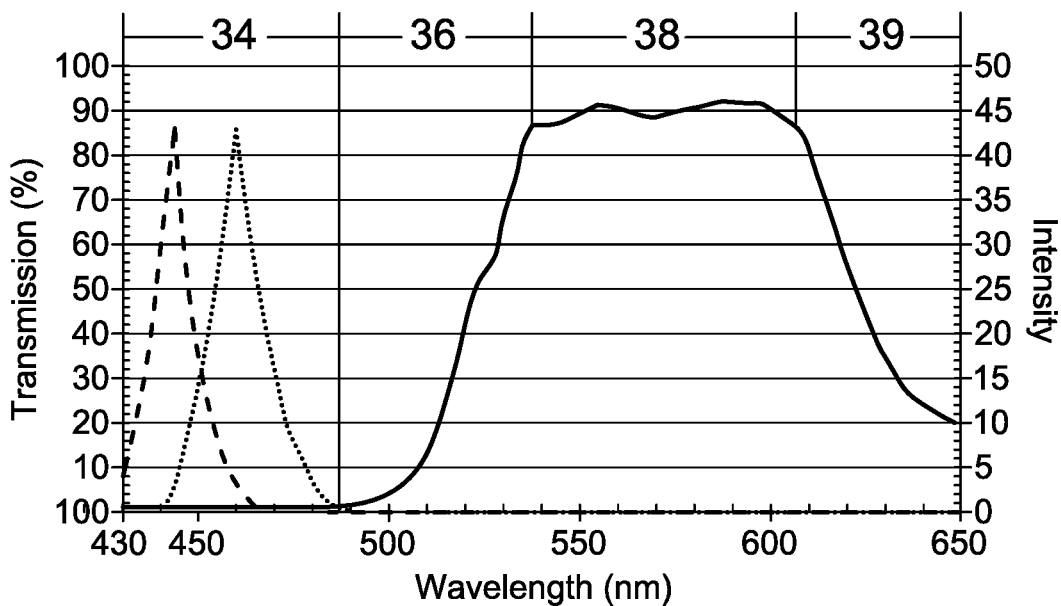
FIG. 5 is a generalized plot of a transmission function of a prior art beamsplitter and of input light at two wavelengths.
Figure 6:
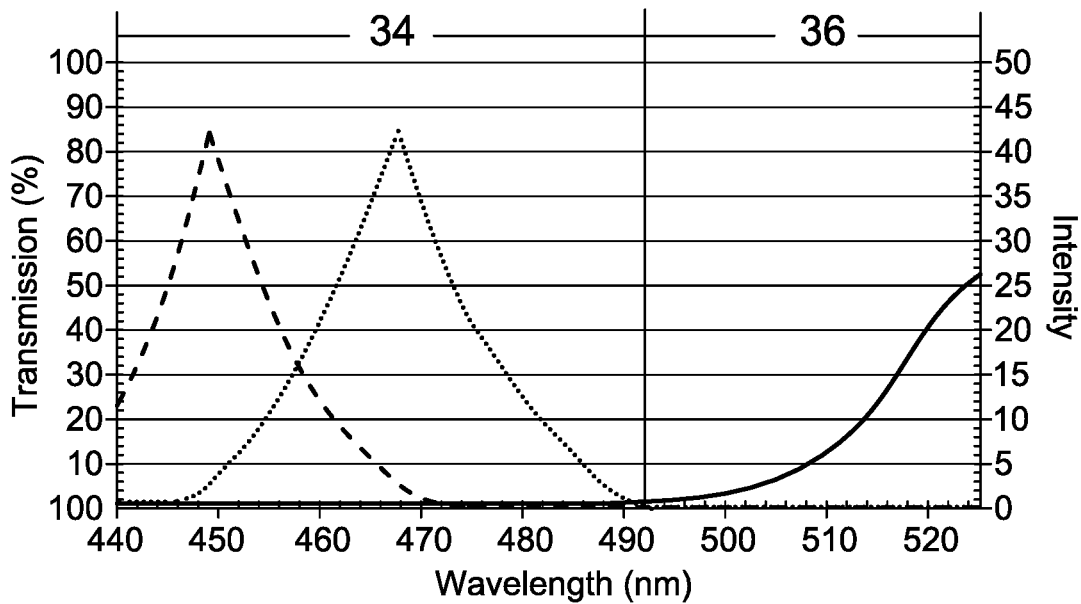
FIG. 6 is a detail view of the plot of FIG. 5.

FIGS. 5 and 6 show the transmission function of the dichroic beamsplitter 30. The reflection region has sufficient spectral bandwidth to accommodate the spectrum of the input light across the excepted spectral range for temperature variations due to heating of the bulb 22. The same reflection region 34, transition region 36 and the transmission region 38 shown in the prior art example of FIGS. 3 and 4 are indicated on the plots in FIGS. 5 and 6 as well.

Unlike the prior art beam splitter transmission function shown in FIGS. 3 and 4, the transmission spectrum of an embodiment of the dichroic beamsplitter 30 is designed to have a constant transmission over a correction range, in this example between 440 nm and 490 nm, a common range for fluorescence experiments. The constant transmission must be non-zero to allow the correction photodetector 62 to have a signal to normalize against, and the near-zero gradient facilitates consistent readings regardless of the spectrum of the incident light 72. The correction range in this experiment, which uses the system 10, is the reflection region 34 at lower wavelengths than the transition region 36. The cut-on wavelength of the transition region 36 is 530 nm. A reduction in transmission beyond 600 nm follows in a decay region 39. The decay region 39 in this case facilitates signal normalization and may be useful for experiments including chlorophyll in samples since chlorophyll exhibits fluorescence beyond about 600 nm. The excitation wavelength for which this beamsplitter was designed is centered on 475 nm. The near-zero gradient of the transmission plot in the spectral region defining the reflection region mitigates the effects that a change in the wavelength of the incident has transmitted optical power at from the light source 20.

Figure 7:
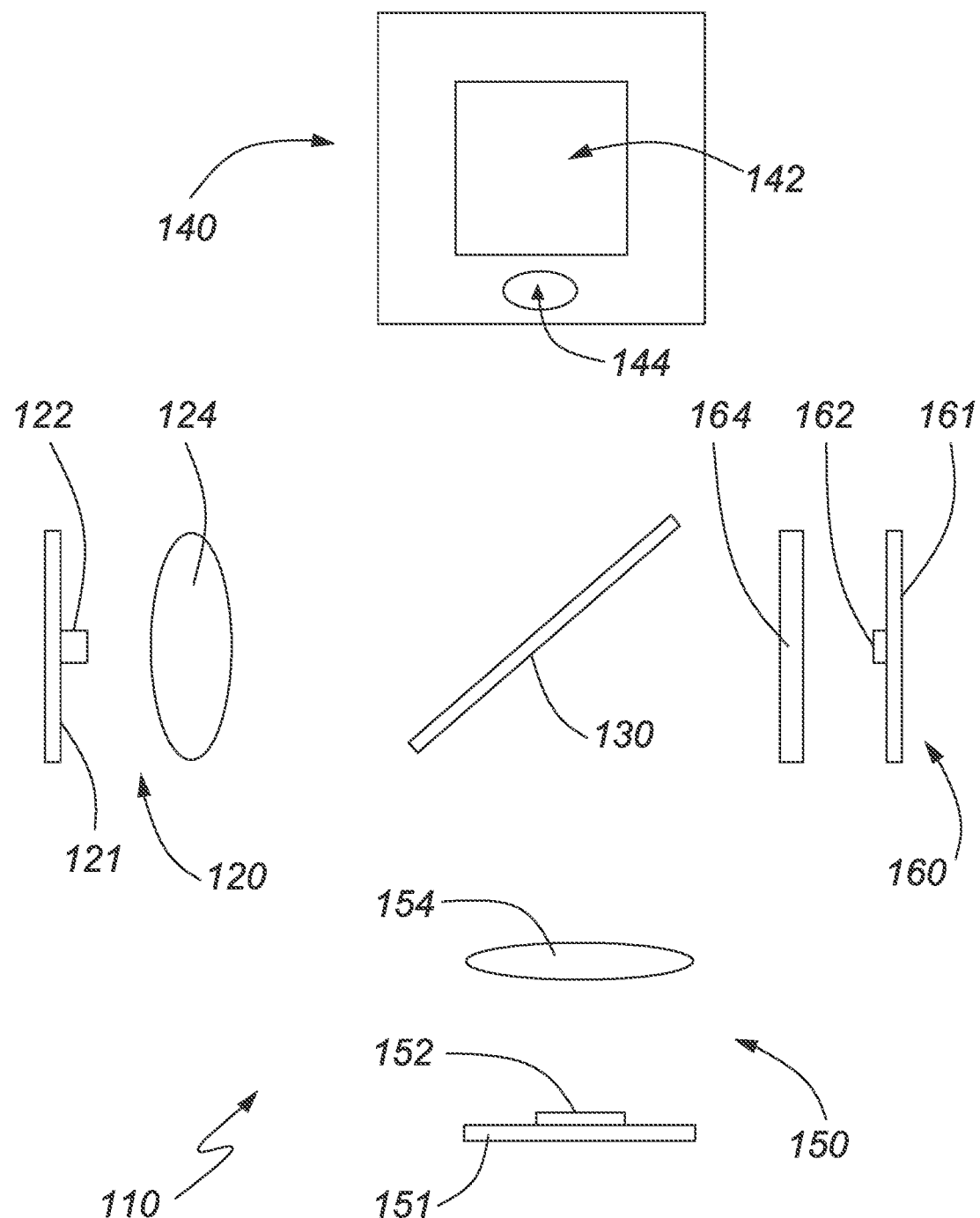
FIG. 7 is a schematic of an optical measurement system.

FIG. 7 is an optical measurement system 110. The system 110 includes the light source 120 and the dichroic beamsplitter 130 downstream of the light source 120. The sample holder 140 is located downstream of the dichroic beamsplitter 130 and in a position to receive reflected light from the light source 120. The output photodetector module 150 is located downstream of the dichroic beamsplitter 130 and in a position to receive sample output light from the light source 120 that has passed through the sample holder 140 and transmitted through the dichroic beamsplitter 130. The correction photodetector module 160 is located downstream of the dichroic beamsplitter 130 and positioned to receive light transmitted through the dichroic beamsplitter 130 from the light source 120.

The light source 120 includes the bulb 122 mounted on the board 121, and the lens 124 positioned downstream of the bulb 122. The bulb 122 largely collimates the input light. The bulb 122 may be any suitable light source, including an LED, an incandescent bulb, a laser, thermal light source, a resonant-cavity LED or others. The lens 124 collimates the input light from the bulb 122.

The dichroic beamsplitter 130 is tuned to allow non-zero transmission of the input light at the wavelengths expected to be incident on the dichroic beamsplitter 130, and to maintain a near-zero change in transmission over the wavelength range of the input light being applied to the sample holder 140.

The sample holder 140 includes the sample cavity 142 for receiving a cuvette or other container for a liquid sample, or for receiving a solid state sample. The sample holder includes the lens 144 for focusing reflected input light onto the sample cavity 142. The lens 144 may be omitted in applications where the light incident on the sample does not benefit from being focused.

The output photodetector module 150 includes an optical sensor 152 mounted on a board 151. The optical sensor 152 is for detecting transmitted light through the dichroic beamsplitter 130 from the sample holder 140. The collection lens 154 is located between the dichroic beamsplitter 130 and the optical sensor 152. In a fluorescence spectrometer, fluorometer, fluorimeter or other fluorescence-based instrument applying the optical measurement system 10, fluorescence light generated by the sample upon excitation by light from the light source 120 is transmitted from the sample holder 140 to the output photodetector 150.

The correction photodetector module 160 provides a feedback photodetector function. The correction photodetector module 160 includes the correction optical sensor 162 mounted on a board 161. The correction optical sensor 162 may include a photodiode or any suitable optical sensor. Light incident on the correction optical sensor 162 is read to determine the intensity of the light that is transmitted through the dichroic beamsplitter 130. The intensity of the light transmitted through the dichroic beamsplitter 130 is corrected to a set value by adjusting power to the bulb 122.

The optical measurement system 110 includes a flattening filter 164 located between the dichroic beamsplitter 30 and the board 161. The flattening filter 164 compensates for sensitivity of the correction optical sensor 162 to changes in temperature. The spectral flattening filter compensates for the wavelength dependent response of the correction photodiode 162. The combination of the spectral flattening filter 164 and the correction photodiode 162 eliminates any wavelength dependence in the feedback control loop of the light source 120. Any change in the wavelength of the light generated by the light source 120 will not affect the optical feedback signal. The feedback control system controlling the lights source 120 current will therefore lock into the optical power of the light source 120 and not be influenced by any change in the light wavelength spectrum.

Figure 8:
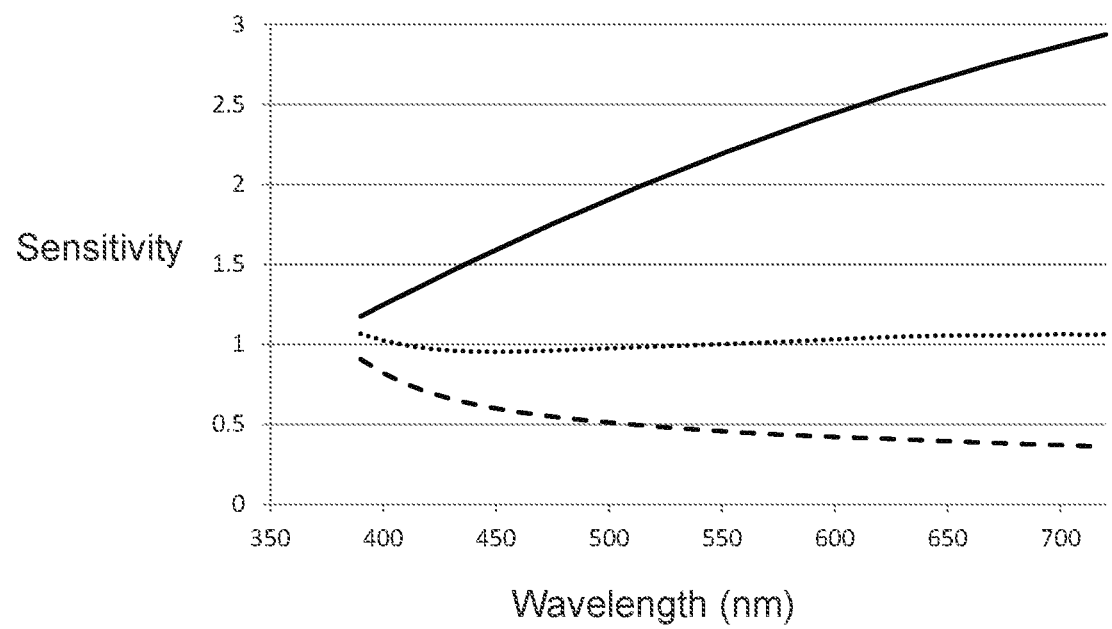
FIG. 8 is a generalized plot showing normalized sensitivity of a photodiode, the FIG. 9 is a schematic of an optical measurement system.

FIG. 8 is a plot of the sensitivity of the correction optical sensor 162 to light by wavelength (solid lines). FIG. 8 also includes a plot of the transmission function of the flattening filter 164 by wavelength (dashed lines). The transmission function of the flattening filter 164 mitigates the effects of wavelength dependence of the correction optical sensor 162, providing a consistent response to incident light regardless of the wavelength. The normalized response of the correction optical sensor by wavelength is shown in dotted lines. By making the response to various wavelengths of incident light uniform, the flattening filter 164 compensates for drift in the output wavelength of the light source 120. With the spectral flattening filter 164 in front of the correction photodetector 162, the spectral response is flattened (dotted line).

The spectral transmission function of this flattening filter 164 is shown as the dashed curve in FIG. 8. The spectral response function of the combined flattening filter 164 and the correction photodetector 162 are shown as the dotted curve in FIG. 8. The dotted curve in FIG. 8 is substantially flat over the wavelength range for which this filter was designed. Thus a change in the spectrum of the filtered light transmitted by the beamsplitter 130 does not significantly alter the signal generated by the correction photodetector 162, with the result that the optical and electronic feedback control system is able to maintain the intensity of the light source at a constant level.

Figure 9:
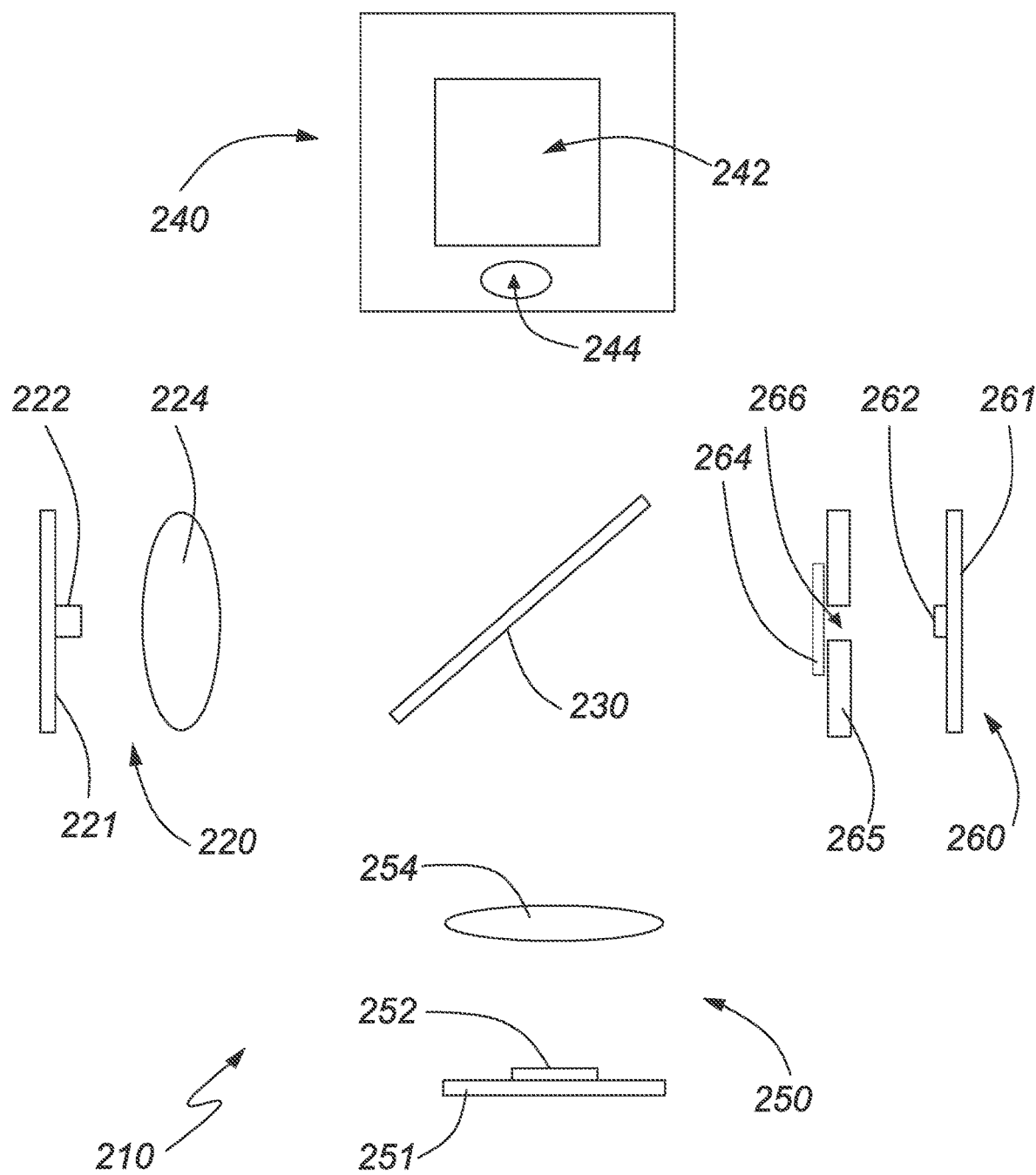

FIG. 9 is an optical measurement system 210. The system 210 includes the light source 220 and the dichroic beamsplitter 230 downstream of the light source 220. The sample holder 240 is located downstream of the dichroic beamsplitter 230 and in a position to receive reflected light from the light source 220. The output photodetector module 250 is located downstream of the dichroic beamsplitter 230 and in a position to receive sample output light from the light source 220 that has passed through the sample holder 240 and transmitted through the dichroic beamsplitter 230. The correction photodetector module 260 is located downstream of the dichroic beamsplitter 230 and positioned to receive light transmitted through the dichroic beamsplitter 230 from the light source 220.

The light source 220 includes the bulb 222 mounted on the board 221, and the lens 224 positioned downstream of the bulb 222. The bulb 222 largely collimates the input light. The bulb 222 may be any suitable light source, including an LED, an incandescent bulb, a laser, thermal light source, a resonant-cavity LED or others. The lens 224 collimates the input light from the bulb 222.

The dichroic beamsplitter 230 is tuned to allow non-zero transmission of the input light at the wavelengths expected to be incident on the dichroic beamsplitter 230, and to maintain a near-zero change in transmission over the wavelength range of the input light being applied to the sample holder 240.

The sample holder 240 includes the sample cavity 242 for receiving a cuvette or other container for a liquid sample, or for receiving a solid state sample. The sample holder includes the lens 244 for focusing reflected input light onto the sample cavity 242. The lens 244 may be omitted in applications where the light incident on the sample does not benefit from being focused.

The output photodetector module 250 includes an optical sensor 252 mounted on a board 251. The optical sensor 252 is for detecting transmitted light through the dichroic beamsplitter 230 from the sample holder 240. The collection lens 254 is located between the dichroic beamsplitter 230 and the optical sensor 252. In a fluorescence spectrometer, fluorometer, fluorimeter or other fluorescence-based instrument applying the optical measurement system 210, fluorescence light generated by the sample upon excitation by light from the light source 220 is transmitted from the sample holder 240 to the output photodetector 250.

The correction photodetector module 260 provides a feedback photodetector function. The correction photodetector module 260 includes the correction optical sensor 262 mounted on a board 261. The correction optical sensor 262 may include a photodiode or any suitable optical sensor. Light incident on the correction optical sensor 262 is read to determine the intensity of the light that is transmitted through the dichroic beamsplitter 230. The intensity of the light transmitted through the dichroic beamsplitter 230 is corrected to a set value by adjusting power to the bulb 222. The system 210 also includes the flattening filter 264.

The optical measurement system 210 includes an insulation shield 265. An aperture 266 is defined in the insulation shield 265. The aperture 266 is aligned with the correction optical sensor 262 for allowing transmitted light to be incident on the optical sensor 262. While transmitted light is passing through the aperture 266, the insulation shield 265 mitigates heating of the board 261 and the correction optical sensor 262.

Figure 10:
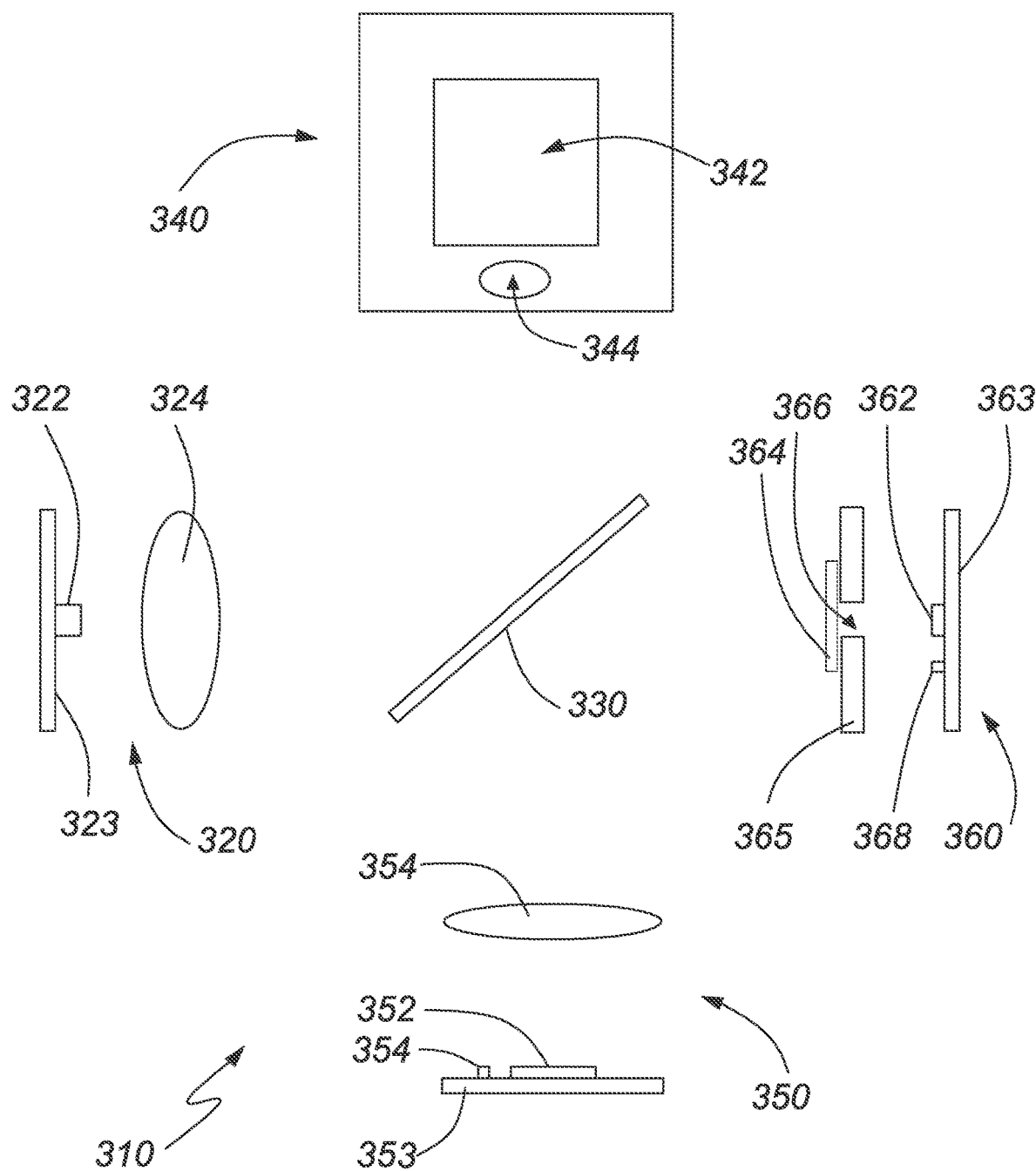
FIG. 10 is a schematic of an optical measurement system.

FIG. 10 is an optical measurement system 310. The system 310 includes the light source 320 and the dichroic beamsplitter 330 downstream of the light source 320. The sample holder 340 is located downstream of the dichroic beamsplitter 330 and in a position to receive reflected light from the light source 320. The output photodetector module 350 is located downstream of the dichroic beamsplitter 330 and in a position to receive sample output light from the light source 320 that has passed through the sample holder 340 and transmitted through the dichroic beamsplitter 330. The correction photodetector module 360 is located downstream of the dichroic beamsplitter 330 and positioned to receive light transmitted through the dichroic beamsplitter 330 from the light source 320.

The light source 320 includes the bulb 322 mounted on a thermally conducting board 323, and the lens 324 positioned downstream of the bulb 322. The bulb 322 largely collimates the input light. The bulb 322 may be any suitable light source, including an LED, an incandescent bulb, a laser, thermal light source, a resonant-cavity LED or others. The lens 324 collimates the input light from the bulb 322.

The dichroic beamsplitter 330 is tuned to allow non-zero transmission of the input light at the wavelengths expected to be incident on the dichroic beamsplitter 330, and to maintain a near-zero change in transmission over the wavelength range of the input light being applied to the sample holder 340.

The sample holder 340 includes the sample cavity 342 for receiving a cuvette or other container for a liquid sample, or for receiving a solid state sample. The sample holder includes the lens 344 for focusing reflected input light onto the sample cavity 342. The lens 344 may be omitted in applications where the light incident on the sample does not benefit from being focused.

The output photodetector module 350 includes an optical sensor 352 mounted on a board 351. The optical sensor 352 is for detecting transmitted light through the dichroic beamsplitter 330 from the sample holder 340. The collection lens 354 is located between the dichroic beamsplitter 330 and the optical sensor 352. In a fluorescence spectrometer, fluorometer, fluorimeter or other fluorescence-based instrument applying the optical measurement system 310, fluorescence light generated by the sample upon excitation by light from the light source 320 is transmitted from the sample holder 340 to the output photodetector 350.

The correction photodetector module 360 provides a feedback photodetector function. The correction photodetector module 360 includes the correction optical sensor 362 mounted on a thermally conducting board 363. The correction optical sensor 362 may include a photodiode or any suitable optical sensor. Light incident on the correction optical sensor 362 is read to determine the intensity of the light that is transmitted through the dichroic beamsplitter 330. The intensity of the light transmitted through the dichroic beamsplitter 330 is corrected to a set value by adjusting power to the bulb 322. The system 210 also includes the flattening filter 364. The system 310 also includes the aperture 366 defined in the insulation shield 365.

The light source 320 is mounted on the thermally conducting circuit board 323. The output photodetector module 350 is mounted on the thermally conducting circuit board 353. The correction photodetector module 360 is mounted on the thermally conducting circuit board 363. Signals generated by both the correction photodetector 360 and the output photodetector 350 are dependent on their temperature. It is therefore desirable to mitigate drift in the temperature of these components. The thermally conducting circuit boards 323, 353 and 364 may be aluminum backed circuit boards. The aluminum or other substrate of the board is electrically separated from a copper layer by a thin layer that is thermally conducting but electrically insulating. The thermally conducting circuit boards are in physical and thermal contact with the metal body of the scope, providing a path for heat generated by the light source 320, the output photodetector 350 and the correction photodetector 360 to be dissipated.

In addition to including features stabilize the temperatures of the correction photodetector 360, and the output photodetector 350, the system 310 includes a correction temperature sensor 368 on the board 361. The system 310 also includes an output temperature sensor 354 on a thermally conducting board 351. The temperature sensors 354 and 368 may be monitored and data logged in by the control software. For both the f correction photodetector 360, and the output photodetector 350, given a known function of the signal in totally dark environment as a function of temperature as well as a known function of the sensitivity as s function of temperature, a correction to the measured and logged readings can be applied in a post-processing stage.

Figure 11:
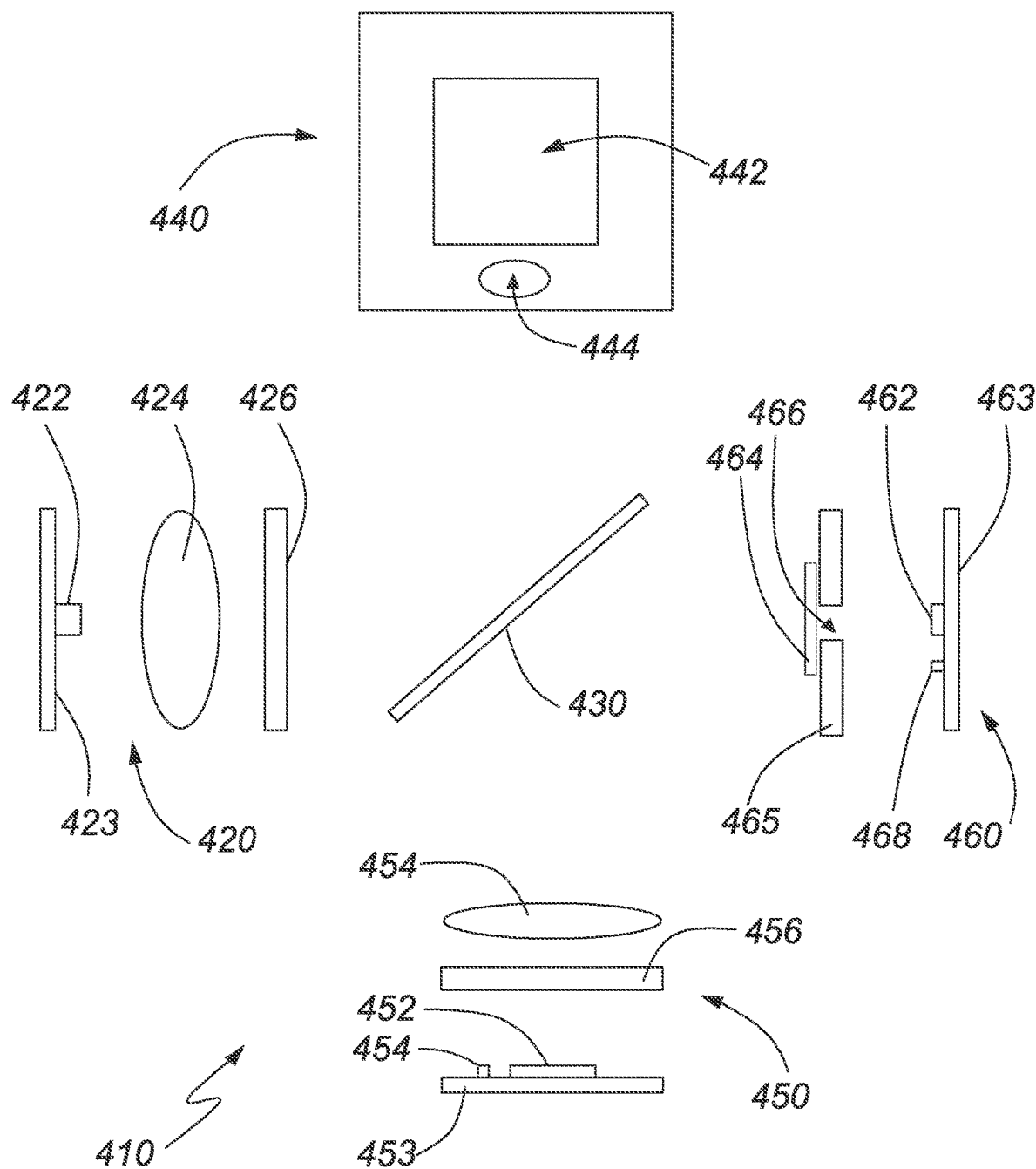
FIG. 11 is a schematic of an optical measurement system.

FIG. 11 is an optical measurement system 410. The system 410 includes the light source 420 and the dichroic beamsplitter 430 downstream of the light source 420. The sample holder 440 is located downstream of the dichroic beamsplitter 430 and in a position to receive reflected light from the light source 420. The output photodetector module 450 is located downstream of the dichroic beamsplitter 430 and in a position to receive sample output light from the light source 420 that has passed through the sample holder 440 and transmitted through the dichroic beamsplitter 430. The correction photodetector module 460 is located downstream of the dichroic beamsplitter 430 and positioned to receive light transmitted through the dichroic beamsplitter 430 from the light source 420.

The light source 420 includes the bulb 422 mounted on the thermally conducting board 421, and the lens 424 positioned downstream of the bulb 422. The bulb 422 largely collimates the input light. The bulb 422 may be any suitable light source, including an LED, an incandescent bulb, a laser, thermal light source, a resonant-cavity LED or others. The lens 424 collimates the input light from the bulb 422.

The dichroic beamsplitter 430 is tuned to allow non-zero transmission of the input light at the wavelengths expected to be incident on the dichroic beamsplitter 430, and to maintain a near-zero change in transmission over the wavelength range of the input light being applied to the sample holder 440.

The sample holder 440 includes the sample cavity 442 for receiving a cuvette or other container for a liquid sample, or for receiving a solid state sample. The sample holder includes the lens 444 for focusing reflected input light onto the sample cavity 442. The lens 444 may be omitted in applications where the light incident on the sample does not benefit from being focused.

The output photodetector module 450 includes an optical sensor 452 mounted on a thermally conducting board 453. The optical sensor 452 is for detecting transmitted light through the dichroic beamsplitter 430 from the sample holder 440. The collection lens 454 is located between the dichroic beamsplitter 430 and the optical sensor 452. In a fluorescence spectrometer, fluorometer, fluorimeter or other fluorescence-based instrument applying the optical measurement system 410, fluorescence light generated by the sample upon excitation by light from the light source 420 is transmitted from the sample holder 440 to the output photodetector 450.

The correction photodetector module 460 provides a feedback photodetector function. The correction photodetector module 460 includes the correction optical sensor 462 mounted on a thermally conducting board 463. The correction optical sensor 462 may include a photodiode or any suitable optical sensor. Light incident on the correction optical sensor 462 is read to determine the intensity of the light that is transmitted through the dichroic beamsplitter 430. The intensity of the light transmitted through the dichroic beamsplitter 430 is corrected to a set value by adjusting power to the bulb 422. The system 410 also includes the temperature sensors 468 and 454 and the flattening filter 464. The system 410 also includes the aperture 466 defined in the insulation shield 465.

In the system 410, collimated light is passed through an optical excitation filter 426, which may be a short pass or bandpass filter. The spectral transmission profile of the optical excitation filter 426 may largely transmit light that is in the excitation range of the sample and block light in the emission range of the sample. The system 410 also includes an emission filter 456, which may be a long pass or bandpass filter that may block excitation wavelengths but allow emission wavelengths through. Fluorescence light excited within the sample in the sample holder 440 may be collimated by the collimating lens 444 in the sample holder 440, and incident upon the dichroic beamsplitter 430. This light is partly transmitted by the dichroic beamsplitter 430 and is incident on the collection lens 454, which focuses that light on to the output photodetector 462. The majority of the light may be transmitted by the dichroic beamsplitter 430. This light is further spectrally filtered by the emission filter 456. The spectral transmission profile of the emission filter 456 may be chosen such that it largely blocks light in the spectral range of the light transmitted by the excitation filter 426, but largely transmits light in the spectral range of the fluorescence generated by the sample in the cuvette.

Figure 12:
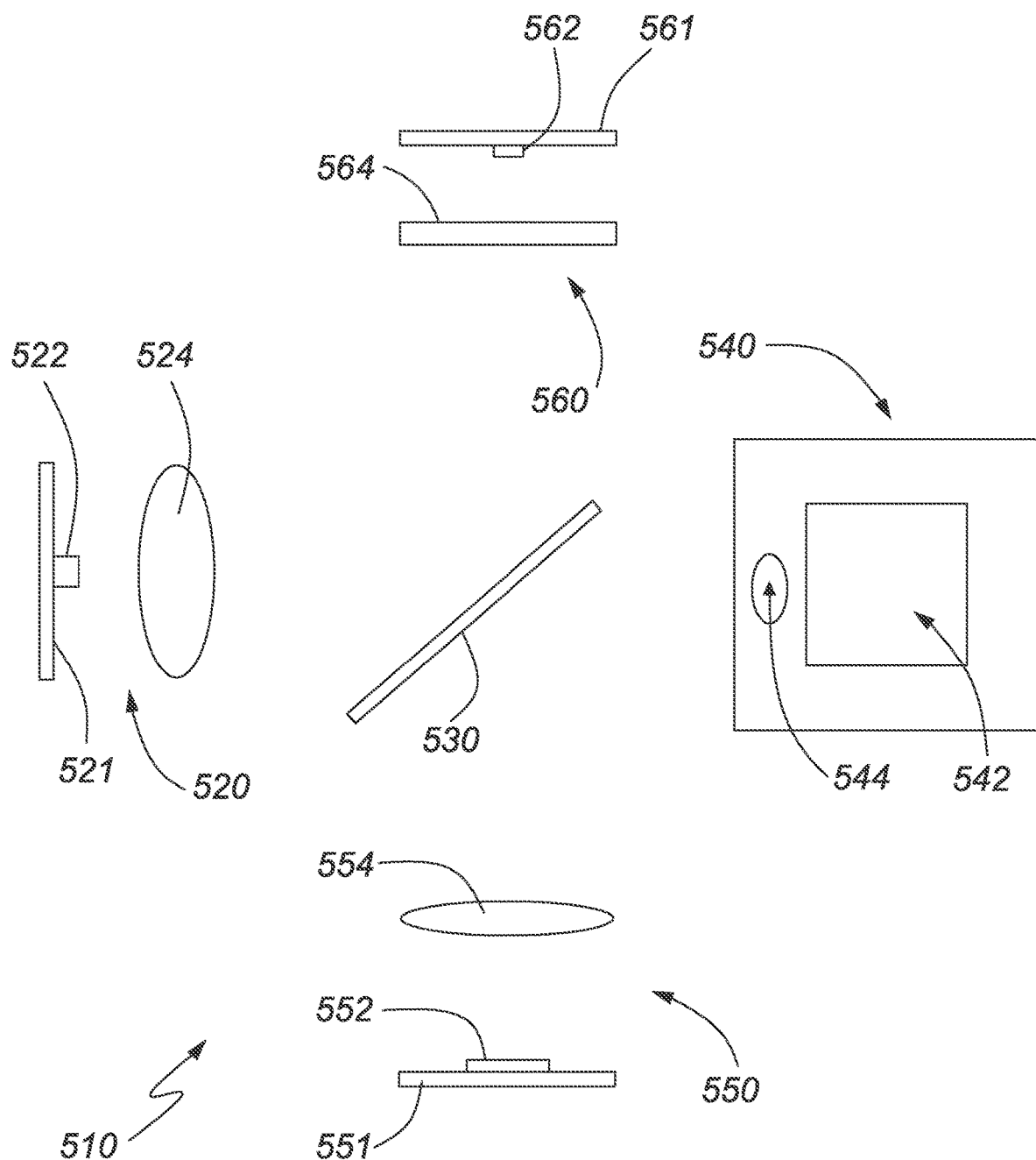
FIG. 12 is a schematic of an optical measurement system.

FIG. 12 is an optical measurement system 510. The system 510 includes the light source 520 and the dichroic beamsplitter 530 downstream of the light source 520. The sample holder 540 is located downstream of the dichroic beamsplitter 530 and in a position to receive reflected light from the light source 520. The output photodetector module 550 is located downstream of the dichroic beamsplitter 530 and in a position to receive sample output light from the light source 520 that has passed through the sample holder 540 and transmitted through the dichroic beamsplitter 530. The correction photodetector module 560 is located downstream of the dichroic beamsplitter 530 and positioned to receive light transmitted through the dichroic beamsplitter 530 from the light source 520.

The light source 520 includes the bulb 522 mounted on the board 521, and the lens 524 positioned downstream of the bulb 522. The bulb 522 largely collimates the input light. The bulb 522 may be any suitable light source, including an LED, an incandescent bulb, a laser, thermal light source, a resonant-cavity LED or others. The lens 524 collimates the input light from the bulb 522.

The dichroic beamsplitter 530 is tuned to allow non-zero transmission of the input light at the wavelengths expected to be incident on the dichroic beamsplitter 530, and to maintain a near-zero change in transmission over the wavelength range of the input light being applied to the sample holder 540.

The sample holder 540 includes the sample cavity 542 for receiving a cuvette or other container for a liquid sample, or for receiving a solid state sample. The sample holder includes the lens 544 for focusing reflected input light onto the sample cavity 542. The lens 544 may be omitted in applications where the light incident on the sample does not benefit from being focused.

The output photodetector module 550 includes an optical sensor 552 mounted on a board 551. The optical sensor 552 is for detecting transmitted light through the dichroic beamsplitter 530 from the sample holder 540. The collection lens 554 is located between the dichroic beamsplitter 530 and the optical sensor 552. In a fluorescence spectrometer, fluorometer, fluorimeter or other fluorescence-based instrument applying the optical measurement system 510, fluorescence light generated by the sample upon excitation by light from the light source 520 is transmitted from the sample holder 540 to the output photodetector 550.

The correction photodetector module 560 provides a feedback photodetector function. The correction photodetector module 560 includes the correction optical sensor 562 mounted on a board 561. The correction optical sensor 562 may include a photodiode or any suitable optical sensor. Light incident on the correction optical sensor 562 is read to determine the intensity of the light that is transmitted through the dichroic beamsplitter 530. The intensity of the light transmitted through the dichroic beamsplitter 530 is corrected to a set value by adjusting power to the bulb 522.

The system 510 is arranged to have incident light excite a sample in the sample holder 540 by transmission through the beamsplitter 530 rather than reflection from the beamsplitter 530.

Figure 13:
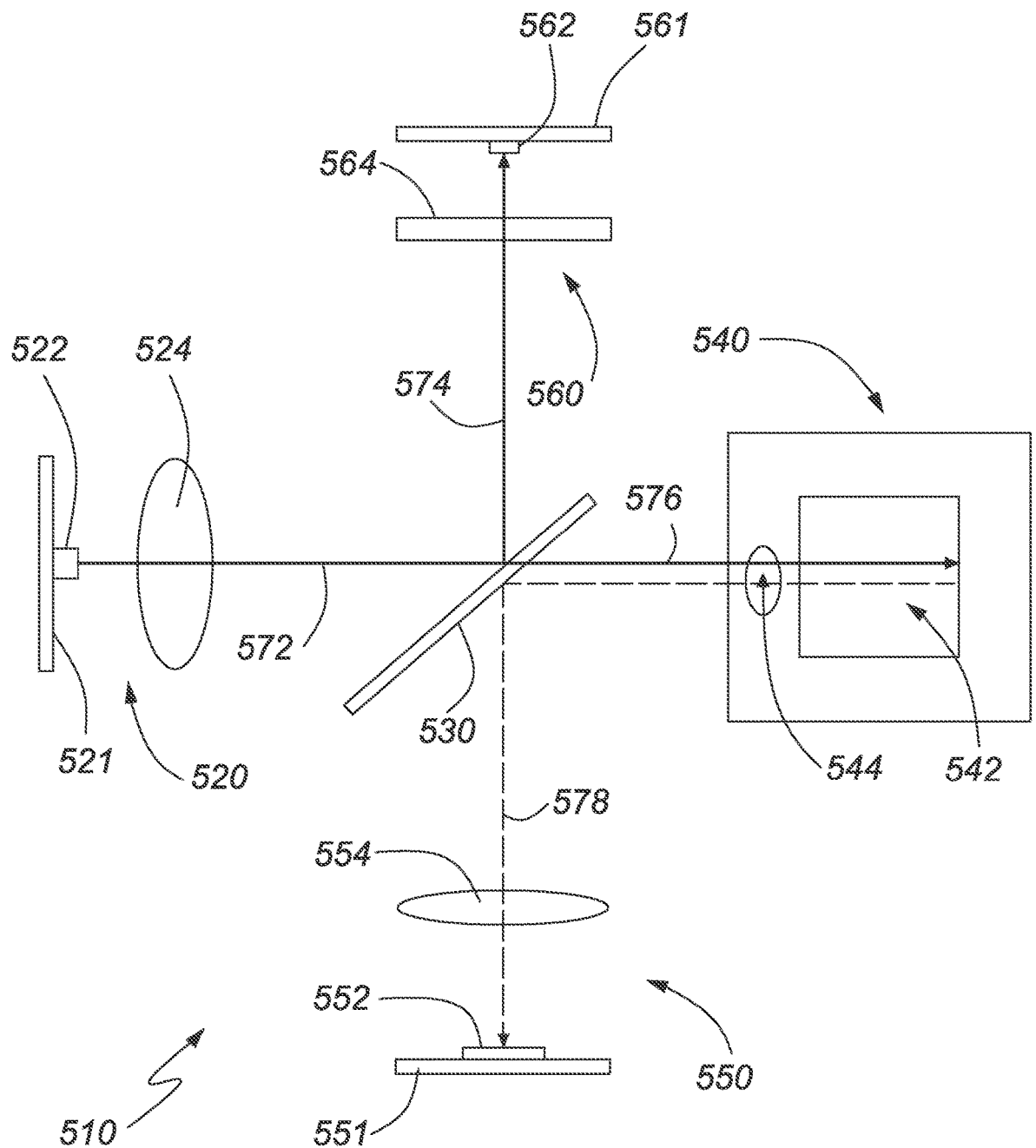
FIG. 13 is a schematic of an optical measurement system.

FIG. 13 is the system 510 in operation. Input light 570 is generated by the light source 520. Incident light 572 reaches the dichroic beamsplitter 530, resulting in the reflected light 574 and the transmitted light 576. The reflected light 574 enters the sample holder 540 and is returned as output light 578, which is reflected from the dichroic beamsplitter 30 and reaches the output photodetector module 550, providing the experimental data. The reflected light 576 reaches the correction photodetector module 560, providing correction data for modulating output of the light source 520. The output light 578 may be fluorescence emission light, light transmitted through the sample holder 540 for an optical density reading, or any suitable output light that is read by the output photodetector 550.

Figure 14:
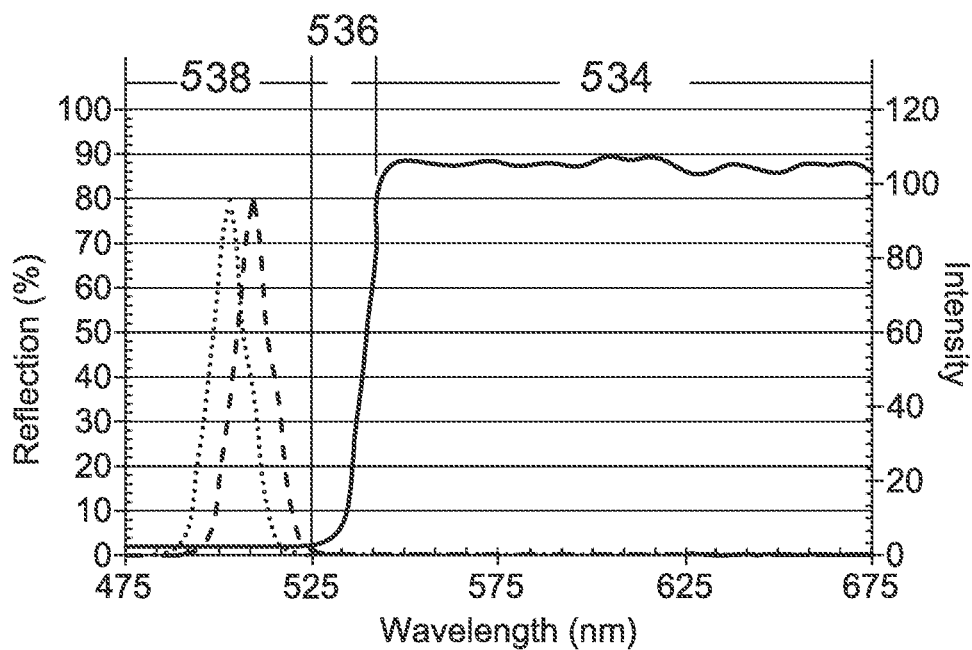
FIG. 14 is a generalized plot of a reflection function of a prior art beamsplitter and of input light at two wavelengths.
Figure 15:
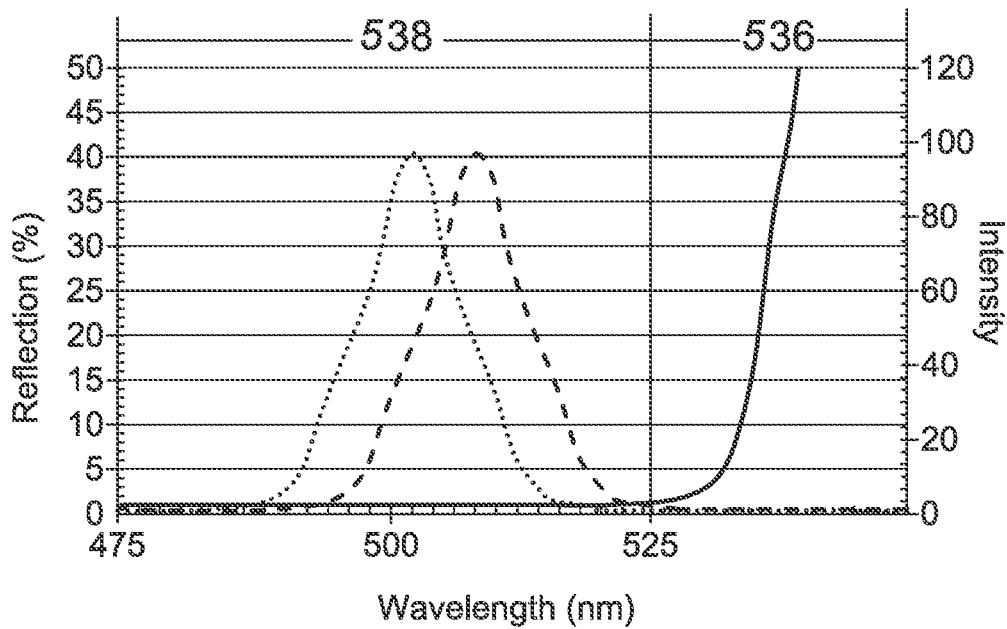
FIG. 15 is a detail view of the plot of FIG. 14.

FIGS. 14 and 15 show the transmission function of the dichroic beamsplitter 530. The transmission region 538 has sufficient spectral bandwidth to accommodate the spectrum of the input light across the excepted spectral range for temperature variations due to heating of the bulb 522, shown in dashed and dotted lines as generalized spectral data varying with temperature. The transition region 536 and the reflection region 534 shown have greater wavelengths than the transmission region 538, and the transmission region 538 has a lower but non-zero baseline. The lights that is detected by the correction photodetector 562 is the reflected light 574, which is reflected in small relative abundance at the transmission region 538.

Figure 16:
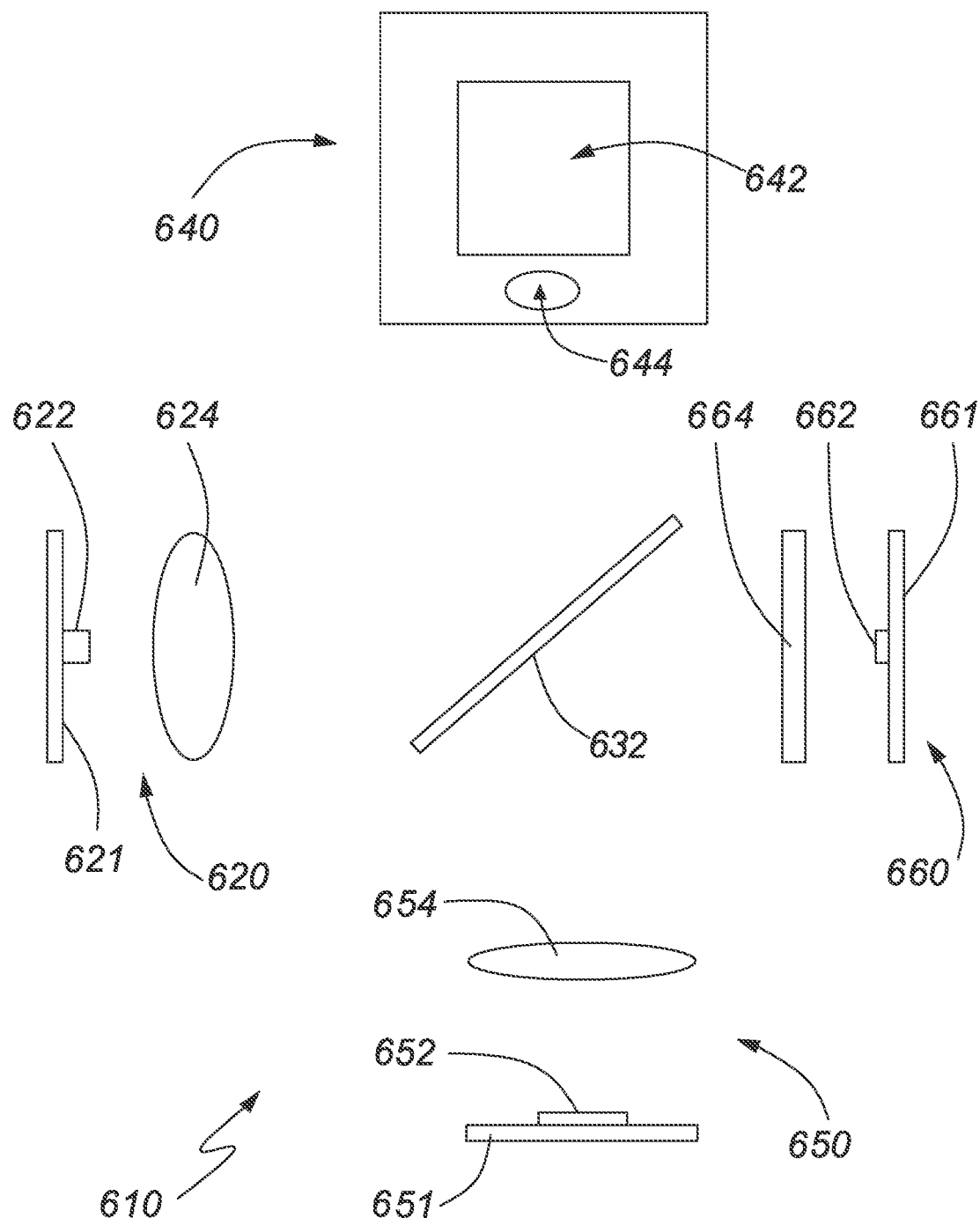
FIG. 16 is a schematic of an optical measurement system.

FIG. 16 is an optical measurement system 610. The system 610 includes the light source 620 and a beamsplitter 632 downstream of the light source 620. The beamsplitter 632 is not a dichroic beamsplitter and light split by the beamsplitter 632 largely has the same spectrum on both reflection and transmission. The sample holder 640 is located downstream of the beamsplitter 632 and in a position to receive reflected light from the light source 620. The output photodetector module 650 is located downstream of the beamsplitter 632 and in a position to receive sample output light from the light source 620 that has passed through, or been generated by, the sample holder 640 and transmitted through the beamsplitter 632. The correction photodetector module 660 is located downstream of the beamsplitter 632 and positioned to receive light transmitted through the beamsplitter 632 from the light source 620.

The light source 620 includes the bulb 622 mounted on the board 621, and the lens 624 positioned downstream of the bulb 622. The lens 624 largely collimates the input light. The bulb 622 may be any suitable light source, including an LED, an incandescent bulb, a laser, thermal light source, a resonant-cavity LED or others. The lens 624 collimates the input light from the bulb 622.

The sample holder 640 includes the sample cavity 642 for receiving a cuvette or other container for a liquid sample, or for receiving a solid state sample. The sample holder includes the lens 644 for focusing reflected input light onto the sample cavity 642. The lens 644 may be omitted in applications where the light incident on the sample does not benefit from being focused.

The output photodetector module 650 includes an optical sensor 652 mounted on a board 651. The optical sensor 652 is for detecting transmitted light through the beamsplitter 632 from the sample holder 640. The collection lens 654 is located between the beamsplitter 632 and the optical sensor 652. In a fluorescence spectrometer, fluorometer, fluorimeter or other fluorescence-based instrument applying the optical measurement system 610, fluorescence light generated by the sample upon excitation by light from the light source 620 is transmitted from the sample holder 640 to the output photodetector 650.

The correction photodetector module 660 provides a feedback photodetector function. The correction photodetector module 660 includes the correction optical sensor 662 mounted on a board 661. The correction optical sensor 662 may include a photodiode or any suitable optical sensor. Light incident on the correction optical sensor 662 is read to determine the intensity of the light that is transmitted through the beamsplitter 632. The intensity of the light transmitted through the beamsplitter 632 is corrected to a set value by adjusting power to the bulb 622.

The optical measurement system 610 includes a flattening filter 664 located between the beamsplitter 632 and the board 661. The flattening filter 664 compensates for sensitivity of the correction optical sensor 662 to changes in temperature. The spectral flattening filter 664 compensates for the wavelength dependent response of the correction photodiode 662. The combination of the spectral flattening filter 664 and the correction photodiode 662 eliminates any wavelength dependence in the feedback control loop of the light source 620. Any change in the wavelength of the light generated by the light source 620 will not affect the optical feedback signal. The feedback control system controlling the lights source 620 current will therefore lock into the optical power of the light source 620 and not be influenced by any change in the light wavelength spectrum.

Figure 17:
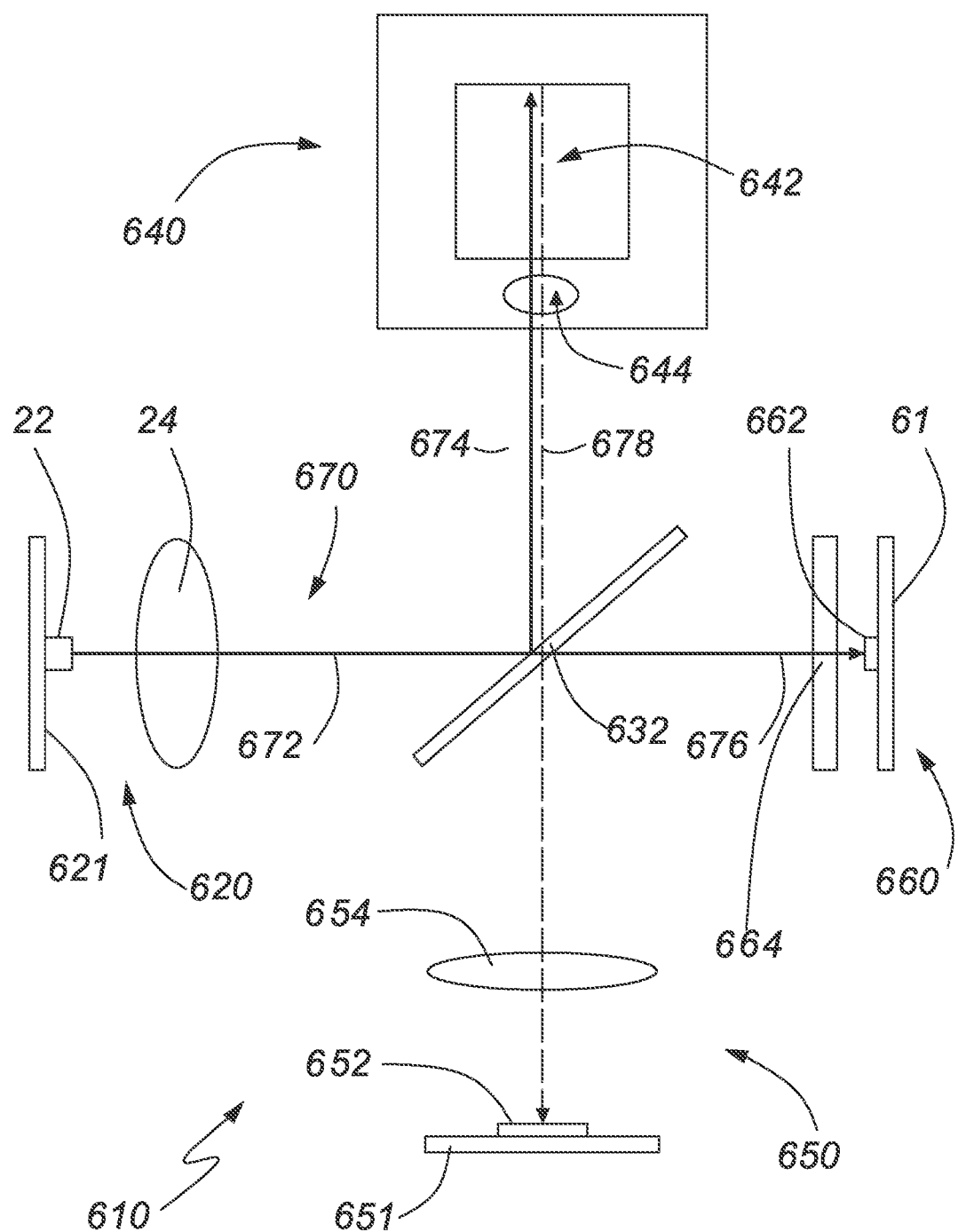
FIG. 17 is a schematic of the system of FIG. 16 in operation.

FIG. 17 is the system 610 in operation. Input light 670 is generated by the light source 620. Incident light 672 reaches the beamsplitter 632, resulting in the reflected light 674 and the transmitted light 676, which have identical spectra. The reflected light 676 enters the sample holder 640 and is returned as output light 678, which is transmitted through the beamsplitter 632 and reaches the output photodetector module 650, providing experimental data. The transmitted light 676 reaches the correction photodetector module 660 after passing through the flattening filter 664, providing correction data for modulating output of the light source 620. Since the output light 678 passes through the flattening filer 664, any temperature artifacts resulting from heating of the correction photodetector 662 are mitigated. The output light 678 may be fluorescence emission light, light transmitted through the sample holder 640 for an optical density reading, or any suitable output light that is read by the output photodetector 650.

Figure 18:
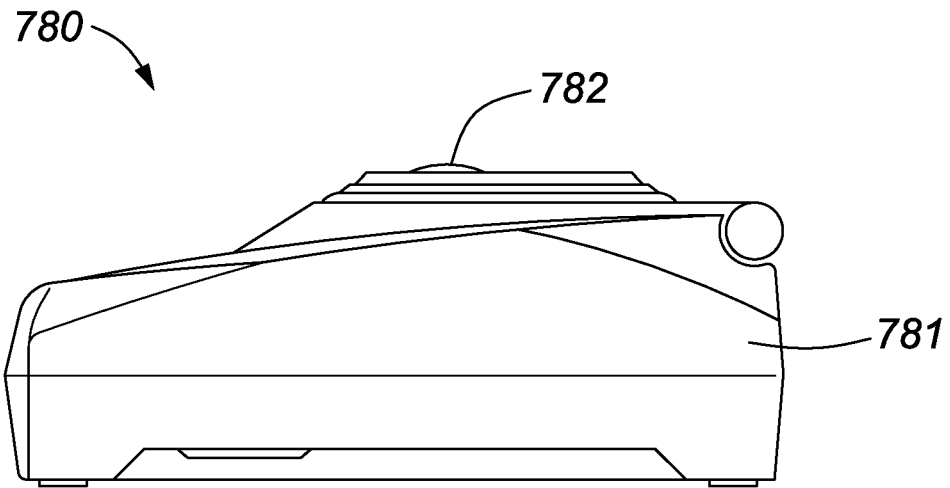
FIG. 18 is an elevation view of an optical measurement system.
Figure 19:
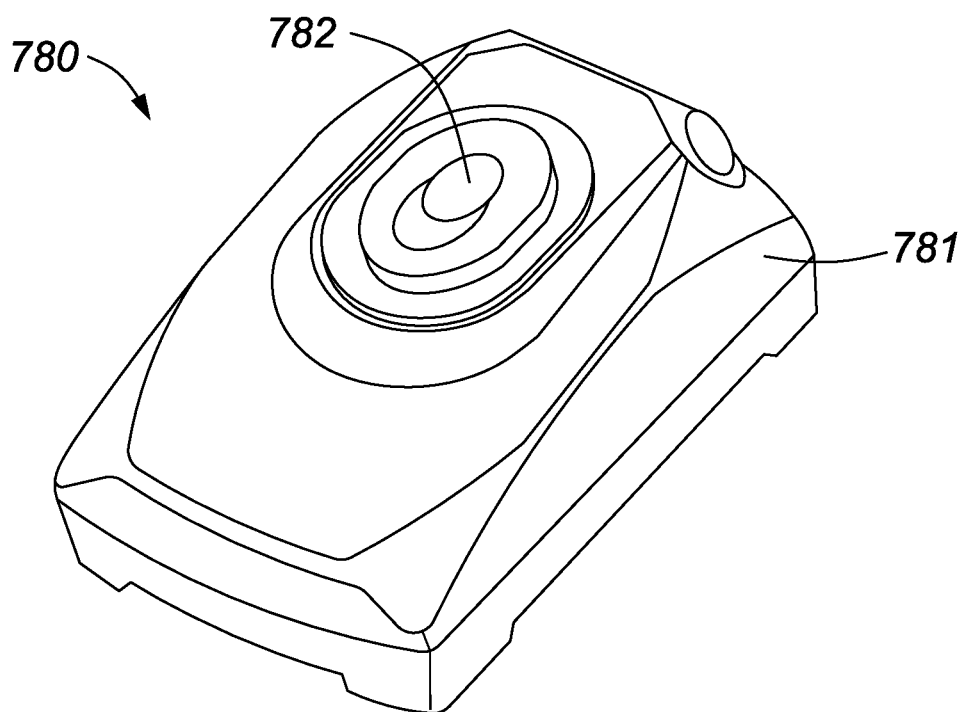
FIG. 19 is a perspective view of the system of FIG. 18.

FIGS. 18 and 19 show a cased optical measurement system 780. The system 780 includes a body 781 with a lid 782.

Figure 20:
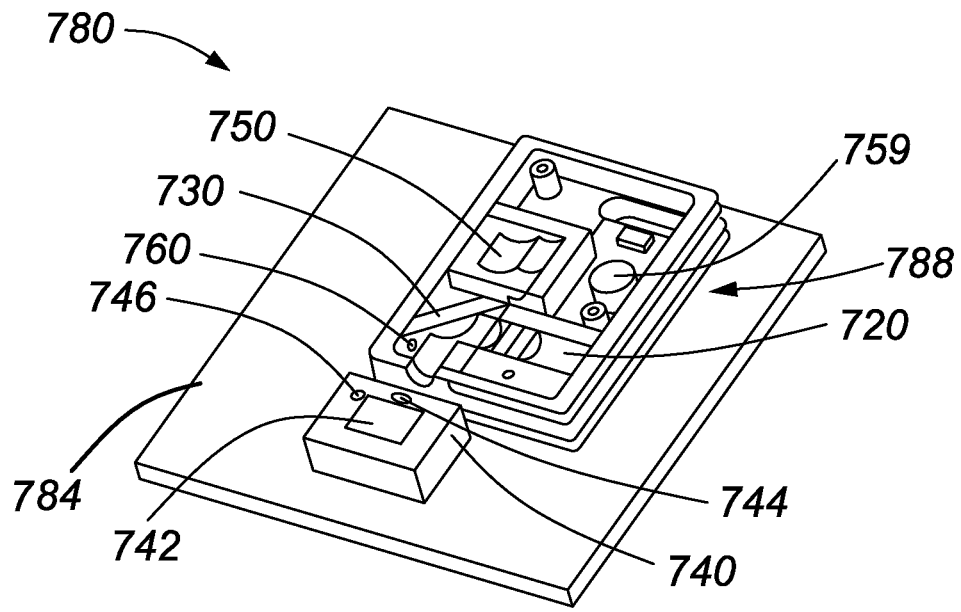
FIG. 20 is a perspective view of the system of FIG. 18 showing interior components.

FIG. 20 shows an interior view of the system 780. One module 788 is connected with a base 784. The module includes the light source 720, the dichroic beamsplitter 730, the sample holder 740 with aperture 742 and lens 744. A flow line 746 is included in the sample holder for temperature control. The output photodetector 750 and the correction photodetector 760 are also included in the module 788. A motor 759 allows rotation of a filter for fluorescence anisotropy work. The base 784 may include an electronics board controlling power management, wireless communications with a computer, GPS location tracking, stirrer motor control, thermal management and communications with the installed scopes. Thermal management is applied to the light source 720 under feedback from the correction module 760. The main electronics board on the base 784 controls the module 788. The module 788 may include an analog to digital converter, allowing digital connection with the base 784 to receive power and to control the module 788. The module 788 may be irremovably held down by a magnet, clips or any suitable method.

Figure 21:
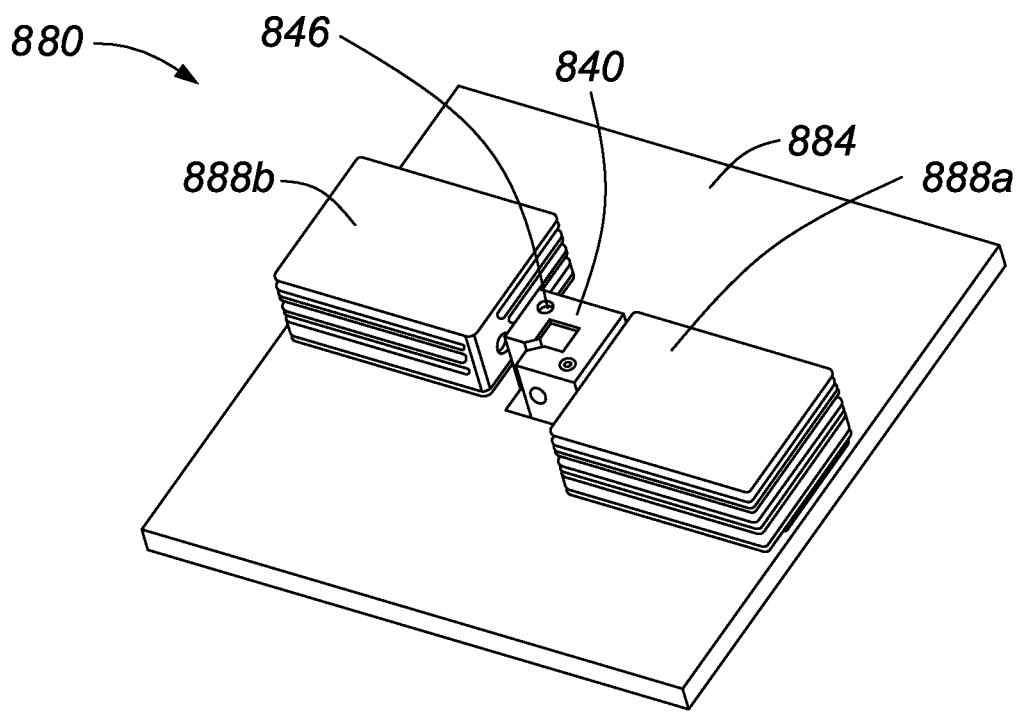
FIG. 21 is a perspective view of an optical measurement system.

FIG. 21 shows a system 880 that includes a first module 888a and a second module 888b each in communication with the sample holder 840. The flow line 846 is also shown.

FIGS. 22 to 29 show a system 980 that includes the first module 988a, the second module 988b, a third module 988c and a fourth module 988d. Each of the modules 988a, 988b, 988c, and 988d is connected with the baseplate 984 and all are in communication with the same sample holder 940.

As in FIG. 23, with the third module 988c removed, a baseplate connector portion 986c can be seen. The baseplate connector portion 986c forms a wired connection to the third module 788c when it is in place. The baseplate connector portion 986c and the base 984 form a receiver for the module.

FIG. 24 shows a cover removed from the third module 988c to show an electronics board 985c. Analog and digital functions may be supported by the electronics board 985c, such as temperature monitoring, analog to digital conversion, LED or laser intensity control and communication with the main electronics board in the instrument. A horizontal slot may be cut into the board to accommodate a moving polarizer lens (e.g. the emission filter 456, etc.) that may be used for fluorescence anisotropy.

FIG. 25 shows the third module 988c with the electronics board 985c removed to show the third light source 920c, the third output photodetector 950c, and the third correction module 960c.

Figure 26:
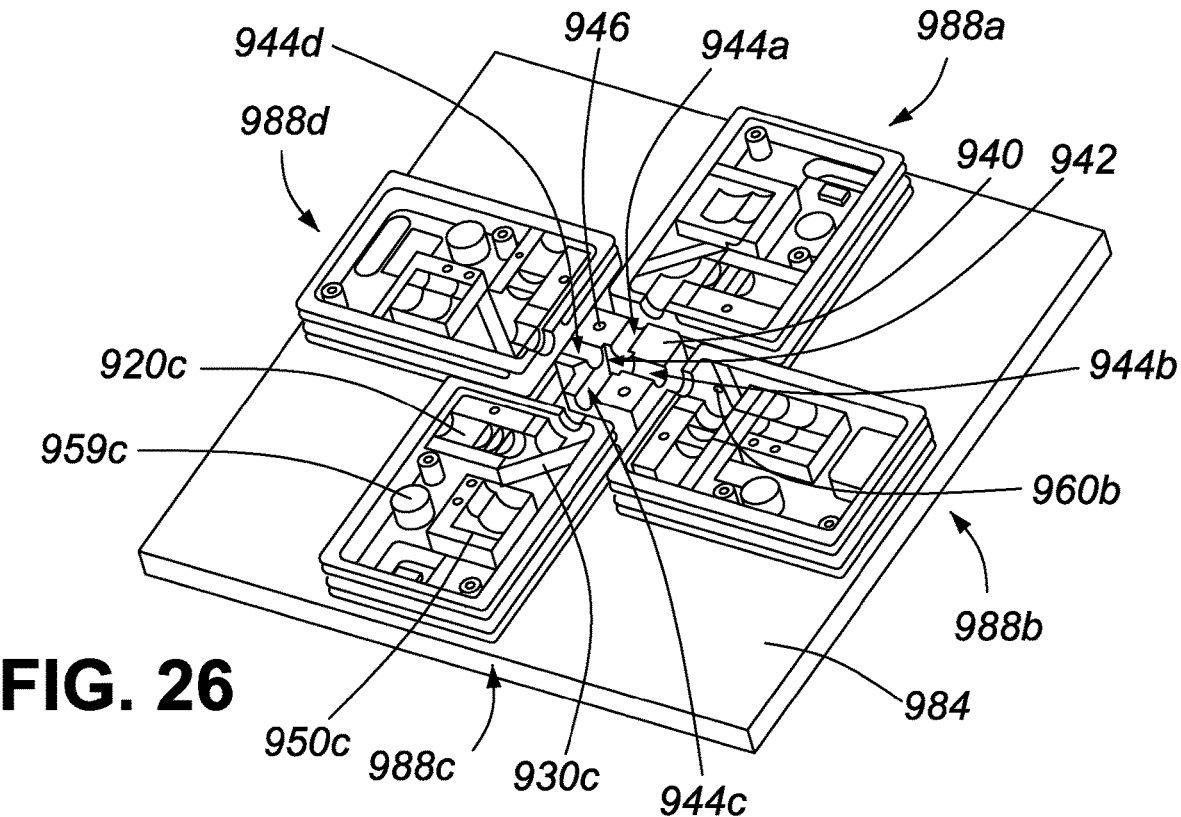
FIG. 26 is a perspective view of the system of FIG. 22 showing interior components of each light source.

FIG. 26 shows a cutaway view of the four modules 988a, 988b, 988c, and 988d connected with the base 984. Details are shown of the third module 988c, including third light source 920c, the third dichroic beamsplitter 930c, the third sample holder 940c with aperture 942 and lenses 944a, 944b, 944c and 944d. The flow line 946 is included in the sample holder for temperature control. The third output photodetector 950c and the third correction photodetector 960c are also included in the third module 988c. The third motor 959c allows rotation of a filter for fluorescence anisotropy work. The base 984 may include an electronics board controlling power management, wireless communications with a computer, GPS location tracking, stirrer motor control, thermal management and communications with the installed scopes.

Figure 27:
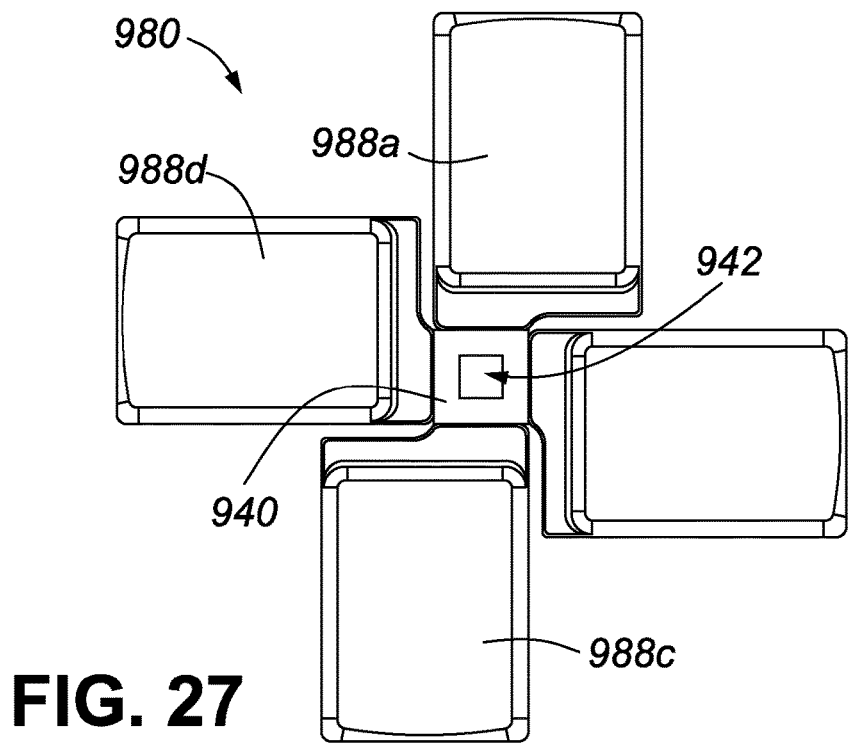
FIG. 27 is a plan view of an optical measurement system with four light source modules.

FIGS. 27 to 30 show various combinations of modules. FIG. 27 shows all four modules 988a, 988b, 988c, and 988d connected with the sample holder 940. FIG. 28 shows only the first module 988a connected with the sample holder 940. FIG. 29 shows all the first module 988a connected with the fourth module 988d, and both connected with the sample holder 940, as may be useful for Raman spectroscopy or scattering. FIG. 29 shows all the first, third and fourth modules 988a, 988c, and 988d connected with the sample holder 940. For example, a fluorescence measurement, whether anisotropy or emission, may not need more than one module 988, while a scattering or OD measurement only needs two modules 988. Any unneeded modules may be left present and deactivated or removed.

Any of the all four modules 988a, 988b, 988c, and 988d connected with the sample holder 940 may be fluorescence or fluorescence anisotropy modules. In cases where transmission is used or OD, then the modules 988a, 988b, 988c, and 988d may be arranged across from each other, as in the system 880.

As for all OD and scattering measurements, the user is able to measure OD and scattering intensity at specific wavelengths by selecting modules 988 with the desired spectral outputs. For example, if the first module 988a is to be used as the emitting scope for monitoring OD, then the third module 988c may be used to measure the output light. If the user wishes to measure OD at wavelengths near 600 nm, the user will select the first module 988a such that its emission spectrum is centered around 600 nm, and will select the third module 988c such that transmission of the light from the first module 988a through the first beamsplitter and any third emission filter in the third scope 988c is able to transmit those wavelengths sufficiently well to enable detection on the optical sensor in the third scope 988c.

Examples Only

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of optical measurement comprising:
   providing a sample in a sample holder;
   providing a light source for generating input light;
   splitting the input light into first light and second light with a dichroic beamsplitter;
   applying the first light to the sample, resulting in output light;
   measuring the output light in an output photodetector, resulting in sample data;
   measuring the second light in a correction photodetector, resulting in correction data; and
   correcting the intensity of the input light based on the correction data;
   wherein one of the first light and the second light comprises reflected light and the other of the first light and the second light comprises transmitted light; and
   the beamsplitter has a transmission function adapted for maintaining a non-zero transmission intensity, and a near-zero gradient, over a correction region of the input light.

2. The method of claim 1 wherein the light source is configured for a spectroscopy technique selected from the group consisting of fluorescence anisotropy, fluorescence emission, scattering, optical density, and Raman spectroscopy.

3. The method of claim 1 wherein providing the light source comprises providing a modular light source configured to be reversibly connected with the sample holder for applying the input light to the dichroic beamsplitter.

4. The method of claim 3 wherein providing the light source comprises providing a plurality of the modular light sources configured to be reversible connected with the sample holder.

5. The method of claim 4 wherein the plurality of modular light sources comprise at least two different light sources configured for at least two spectroscopy techniques.

6. The method of claim 1 wherein the first light comprises reflected light, the second light comprises transmitted light and the correction region comprises a reflection region.

7. The method of claim 1 wherein the first light comprises transmitted light, the second light comprises reflected light and the correction region comprises a transmission region.

8. The method of claim 1 wherein applying the second light to the photodetector for measuring the second light comprises:
   filtering the second light with a flattening filter, resulting in filtered light; and
   applying the filtered light to the correction photodetector for measuring the filtered light;
   wherein the correction photodiode has a sensitivity function that varies with wavelength; and
   the flattening filter has a transmission function adapted for normalizing the spectrum of the second light with respect to the sensitivity function to mitigate wavelength-dependent photosensitivity of the photodiode.

9. The method of claim 1 wherein the near-zero gradient comprises a normalized figure of merit below 0.25 at all points on the correction region, and averaging below 0.15 on the correction region.

10. The method of claim 1 comprising applying a short-pass filter or band-pass filter to the input light.

11. The method of claim 1 comprising applying a long-pass filter or band-pass filter to the output light.

12. The method of claim 1 comprising acquiring correction temperature data at the correction photodetector and normalizing the output of the correction photodetector based on the correction temperature data.

13. The method of claim 1 comprising acquiring output temperature data at the output photodetector and normalizing the output of the output photodetector based on the output temperature data.

14. A system for optical measurement comprising:
   a light source for generating input light;
   a dichroic beamsplitter downstream of the light source for splitting the input light into first light and second light;
   a sample holder downstream of a first path of the beamsplitter for receiving the first light, resulting in output light;
   an output photodetector for measuring output light emitted from the sample;
   a correction photodetector downstream of a second path of the beamsplitter for receiving the second light;
   wherein one of the first light and the second light comprises reflected light and the other of the first light and the second light comprises transmitted light;
   the correction photodetector is configured for providing control signals to the light source for maintaining an intensity of the input light; and
   the beamsplitter has a transmission function that maintains a non-zero transmission intensity and near-zero gradient over a correction region of the input light.

15. The system of claim 14 wherein the light source is configured for a spectroscopy technique selected from the group consisting of fluorescence anisotropy, fluorescence emission, scattering, optical density, and Raman spectroscopy.

16. The system of claim 14 wherein the light source comprises a modular light source configured to be reversibly connected with the sample holder.

17. The system of claim 16 wherein the light source comprises a plurality of the modular light sources, each configured to be reversibly connected with the sample holder.

18. The system of claim 17 wherein the plurality of modular light sources comprise at least two different light sources configured for at least two spectroscopy techniques.

19. The system of claim 14 wherein the first light comprises reflected light, the second light comprises transmitted light and the correction region comprises a reflection region.

20. The system of claim 14 wherein the first light comprises transmitted light, the second light comprises reflected light and the correction region comprises a transmission region.

21. The system of claim 14 comprising:
a flattening filter in the second path for filtering the second light, resulting in filtered light;
wherein the correction photodetector is downstream of the flattening filter for receiving the filtered light;
the correction photodiode has a sensitivity function that varies with wavelength; and
the flattening filter has a transmission function adapted for normalizing the spectrum of the second light with respect to the sensitivity function to mitigate wavelength-dependent photosensitivity of the photodiode.

22. The system of claim 14 wherein the near-zero gradient comprises a normalized figure of merit below 0.25 at all points on the correction region, and averaging below 0.15 on the correction region.

23. The system of claim 14 comprising a short-pass filter or a bandpass filter between the light source and the dichroic beamsplitter.

24. The system of claim 14 comprising a long-pass filter or a bandpass filter between the dichroic beamsplitter and the output photodetector.

25. The system of claim 14 comprising a correction temperature sensor proximate the correction photodetector for acquiring correction temperature data at the correction photodetector and normalizing the output of the correction photodetector based on the output temperature data.

26. The system of claim 14 comprising an output temperature sensor proximate the output photodetector for acquiring output temperature data at the output photodetector and normalizing the output of the output photodetector based on the output temperature data.

27. The system of claim 14 comprising an insulating shield between the light source and the correction photodetector for mitigating heating of the correction photodetector, the insulating shield defining an aperture for providing access to the correction photodetector by the light source.

28. The system of claim 14 comprising a heatsink in thermal communication with the correction photodetector for cooling the correction photodetector.

29. The system of claim 28 wherein the heatsink comprises a thermally conductive circuit board in operative communication with the correction photodetector.

30. The system of claim 29 wherein the thermally conductive circuit board is in thermal connection with the light source for cooling the light source.

31. The system of claim 29 wherein the thermally conductive circuit board is in thermal connection with the output photodetector for cooling the output photodetector.

* * * * *

UNITED STATES PATENT AND TRADEMARK OFFICE
CERTIFICATE OF CORRECTION

PATENT NO. : 10,684,167 B2
APPLICATION NO. : 16/098763
DATED : June 16, 2020
INVENTOR(S) : Elmar Prenner and Kirat Singh Page 1 of 1

It is certified that error appears in the above-identified patent and that said Letters Patent is hereby corrected as shown below:

On the Title Page

Insert Item (30):
--(30) Foreign Application Priority Data
Oct. 31, 2017 (CA) ........... 2,984,276
Nov. 1, 2017 (CA) ........... 2,984,288--

Signed and Sealed this
Twentieth Day of October, 2020

Andrei Iancu
*Director of the United States Patent and Trademark Office*